United States Patent
Li et al.

(10) Patent No.: US 11,705,982 B2
(45) Date of Patent: Jul. 18, 2023

(54) METHODS AND APPARATUS FOR ADJUSTING WIRELESS COMMUNICATION STRUCTURE

(71) Applicant: QUALCOMM Incorporated, San Diego, CA (US)

(72) Inventors: Junyi Li, Chester, NJ (US); Juan Montojo, San Diego, CA (US); Chong Li, Weehawken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/254,246

(22) Filed: Jan. 22, 2019

(65) Prior Publication Data

US 2019/0229837 A1    Jul. 25, 2019

Related U.S. Application Data

(60) Provisional application No. 62/620,968, filed on Jan. 23, 2018.

(51) Int. Cl.
*H04L 1/00* (2006.01)
*H04W 72/0446* (2023.01)
(Continued)

(52) U.S. Cl.
CPC .......... *H04L 1/0006* (2013.01); *H04L 1/1664* (2013.01); *H04L 5/003* (2013.01);
(Continued)

(58) Field of Classification Search
CPC ..... H04L 1/0006; H04L 1/1664; H04L 5/003; H04L 5/0058; H04L 5/0098; H04L 5/0055; H04W 72/0446
See application file for complete search history.

(56) References Cited

U.S. PATENT DOCUMENTS

| 2013/0344878 | A1 | 12/2013 | Whinnett |
| 2015/0133137 | A1* | 5/2015 | Lee ................... H04W 72/0486 455/452.1 |

(Continued)

FOREIGN PATENT DOCUMENTS

| WO | 2016064544 A1 | 4/2016 |
| WO | WO-2017140591 A1 | 8/2017 |

(Continued)

OTHER PUBLICATIONS

Efficient Control Signaling for Resource Allocation in OFDMA Network, Gwanmo Ku, Drexel University (Year: 2014).*

(Continued)

*Primary Examiner* — Yu-Wen Chang
(74) *Attorney, Agent, or Firm* — Holland & Hart LLP

(57) ABSTRACT

Methods and apparatus for wireless communication are provided. In aspects, a method of wireless communication is provided, including scheduling ultra-reliable and low-latency communications (URLLC) communication in a first set of one or more portions of a self-contained wireless communication structure having a plurality of portions, and adjusting one or more (e.g., remaining) portions of the self-contained wireless communication structure subsequent the first set of one or more portions based on the scheduling. In aspects, the method further includes transmitting an indicator of the adjusting to one or more user equipments. Numerous other aspects are provided.

26 Claims, 17 Drawing Sheets

(51) Int. Cl.
*H04L 1/1607* (2023.01)
*H04L 5/00* (2006.01)

(52) U.S. Cl.
CPC .......... *H04L 5/0058* (2013.01); *H04L 5/0098* (2013.01); *H04W 72/0446* (2013.01); *H04L 5/0055* (2013.01)

(56) References Cited

U.S. PATENT DOCUMENTS

| | | | | |
|---|---|---|---|---|
| 2016/0037550 | A1* | 2/2016 | Barabell | H04W 72/046 455/450 |
| 2017/0019886 | A1* | 1/2017 | Patel | H04W 76/14 |
| 2017/0135116 | A1* | 5/2017 | Kuchibhotla | H04L 5/0053 |
| 2017/0332359 | A1* | 11/2017 | Tsai | H04L 5/0053 |
| 2017/0367110 | A1 | 12/2017 | Li et al. | |
| 2018/0070341 | A1* | 3/2018 | Islam | H04L 5/0064 |
| 2018/0083758 | A1* | 3/2018 | Islam | H04L 5/0083 |
| 2018/0139646 | A1* | 5/2018 | Basu Mallick | H04W 16/32 |
| 2018/0199366 | A1* | 7/2018 | Manolakos | H04L 5/0055 |
| 2018/0242317 | A1* | 8/2018 | Marinier | H04W 56/001 |
| 2018/0288746 | A1* | 10/2018 | Zhang | H04L 5/0048 |
| 2018/0324772 | A1* | 11/2018 | Babaei | H04L 5/00 |
| 2019/0014576 | A1 | 1/2019 | Liao et al. | |
| 2019/0052432 | A1* | 2/2019 | Islam | H04L 5/0094 |
| 2019/0098622 | A1* | 3/2019 | Lee | H04W 52/365 |
| 2020/0052811 | A1* | 2/2020 | Li | H04L 5/1469 |
| 2020/0059821 | A1 | 2/2020 | Wirth et al. | |
| 2020/0068537 | A1 | 2/2020 | Oh et al. | |
| 2020/0107317 | A1* | 4/2020 | Ryu | H04W 72/0413 |
| 2020/0136783 | A1* | 4/2020 | Takeda | H04L 5/0055 |
| 2020/0281012 | A1* | 9/2020 | Behravan | H04W 72/1284 |
| 2020/0367182 | A1* | 11/2020 | Zou | H04W 72/04 |

FOREIGN PATENT DOCUMENTS

| | | |
|---|---|---|
| WO | WO-2017156369 A1 | 9/2017 |
| WO | 2017209585 A1 | 12/2017 |
| WO | WO-2018009572 A1 | 1/2018 |

OTHER PUBLICATIONS

CATT: "NR Scheduling Procedure", 3GPP Draft; R1-1611396, 3rd Generation Partnership Project (3GPP), Mobile Competence Centre, 650, Route Des Lucioles, F-06921 Sophia-Anti Polis Cedex, France, vol. RAN WG1, No. Reno, USA; Nov. 14, 2016-Nov. 18, 2016, Nov. 13, 2016 (Nov. 13, 2016), 3 Pages, XP051175377, Retrieved from the internet: URL: http://www.3gpp.org/ftp/Meetings_3GPP_SYNC/RAN1/Docs/ [retrieved on Nov. 13, 2016].

International Search Report and Written Opinion—PCT/US2019/014706—ISA/EPO—dated Apr. 11, 2019.

Samsung: "Slot Reconfiguration for Low Latency in TDD", 3GPP Draft; R1-1715987, 3rd Generation Partnership Project (3GPP), Mobile Competence Centre, 650, Route Des Lucioles ; F-06921 Sophia-Antipolis Cedex, France, vol. RAN WG1, No. Nagoya, Japan; Sep. 18, 2017-Sep. 21, 2017, Sep. 17, 2017 (Sep. 17, 2017), pp. 1-6, XP051339446, Retrieved from the Internet: URL: http://www.3gpp.org/ftp/Meetings_3GPP_SYNC/RAN1/Docs/ [retrieved on Sep. 17, 2017], Sections 1-2.

* cited by examiner

METHODS AND APPARATUS FOR ADJUSTING WIRELESS COMMUNICATION STRUCTURE

CLAIM OF PRIORITY UNDER 35 U.S.C. § 119

This application claims the benefit of U.S. Provisional Application No. 62/620,968, entitled "METHODS AND APPARATUS FOR ADJUSTING WIRELESS COMMUNICATION STRUCTURE" and filed on Jan. 23, 2018, the entire content of which is hereby incorporated by reference.

BACKGROUND

Field

Aspects of the present disclosure generally relate to wireless communication, and more particularly to methods and apparatus for adjusting (e.g., dynamically) wireless communication structure.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different wireless communication devices to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In aspects, a method of wireless communication by a base station is provided, the method comprising scheduling a low-latency packet in a self-contained wireless communication structure having a plurality of portions, adjusting, based on the scheduling of the low-latency packet, one or more portions of the self-contained wireless communication structure, wherein the adjusting comprises adjusting at least one uplink symbol to a downlink symbol, or at least one downlink symbol to an uplink symbol in the self-contained wireless communication structure, transmitting the low-latency packet and an indicator of the adjusting to a user equipment (UE) using the adjusted wireless communication structure, and receiving an acknowledgement message associated with the low-latency packet within the self-contained wireless communication structure from the UE.

In aspects, another method of wireless communication by a user equipment (UE) is provided, the method comprising receiving an indicator in a self-contained wireless communication structure having a plurality of portions, wherein the indicator indicates an adjustment, based on scheduling of a low-latency packet, of at least one uplink symbol to a downlink symbol, or at least one downlink symbol to an uplink symbol in the self-contained wireless communication structure, receiving the low latency packet based on receiving the indicator, and transmitting an acknowledgement message associated with the low-latency packet within the self-contained wireless communication structure.

In aspects, an apparatus for wireless communication is provided. The apparatus comprises means for scheduling a low-latency packet in a self-contained wireless communication structure having a plurality of portions, means for adjusting, based on the scheduling of the low-latency packet, one or more portions of the self-contained wireless communication structure, wherein the adjusting comprises adjusting at least one uplink symbol to a downlink symbol, or at least one downlink symbol to an uplink symbol in the self-contained wireless communication structure, means for transmitting the low-latency packet and an indicator of the adjusting to a user equipment (UE), and means for receiving an acknowledgement message associated with the low-latency packet within the self-contained wireless communication structure from the UE.

In aspects, another apparatus for wireless communication is provided. The apparatus comprises means for receiving an indicator in a self-contained wireless communication structure having a plurality of portions, wherein the indicator indicates adjusting of, based on scheduling of a low-latency packet, at least one uplink symbol to a downlink symbol, or at least one downlink symbol to an uplink symbol in the self-contained wireless communication structure, means for receiving the low latency packet based on receiving the indicator, and means for transmitting an acknowledgement message associated with the low-latency packet within the self-contained wireless communication structure.

In aspects, an apparatus for wireless communication is provided. The apparatus may comprise a memory and at least one processor coupled to the memory. The processor may be configured to schedule a low-latency packet in a self-contained wireless communication structure having a plurality of portions, adjust, based on the scheduling of the low-latency packet, one or more portions of the self-contained wireless communication structure, wherein the adjusting comprises adjusting at least one uplink symbol to a downlink symbol, or at least one downlink symbol to an uplink symbol in the self-contained wireless communication structure, transmit the low-latency packet and an indicator of the adjusting to a user equipment (UE), and receive an acknowledgement message associated with the low-latency packet within the self-contained wireless communication structure from the UE.

In aspects, another apparatus for wireless communication is provided. The apparatus may comprise a memory and at least one processor coupled to the memory. The at least one processor may be configured to receive an indicator in a self-contained wireless communication structure having a plurality of portions, wherein the indicator indicates an adjustment, based on scheduling of a low-latency packet, of at least one uplink symbol to a downlink symbol, or at least one downlink symbol to an uplink symbol in the self-contained wireless communication structure, receive the low latency packet based on receiving the indicator, and transmit an acknowledgement message associated with the low-latency packet within the self-contained wireless communication structure.

In aspects, a computer program product is provided. The computer program product may include a non-transitory computer-readable medium storing computer executable code. The code may include code to schedule a low-latency packet in a self-contained wireless communication structure having a plurality of portions, adjust, based on the scheduling of the low-latency packet, one or more portions of the self-contained wireless communication structure, wherein the adjusting comprises adjusting at least one uplink symbol to a downlink symbol, or at least one downlink symbol to an uplink symbol in the self-contained wireless communication structure, transmit the low-latency packet and an indicator of the adjusting to a user equipment (UE), wherein the transmission of the indicator precedes the transmission of the low-latency packet, and receive an acknowledgement message associated with the low-latency packet within the self-contained wireless communication structure from the UE.

In aspects, another computer program product is provided. The computer program product may include a non-transitory computer-readable medium storing computer executable code. The code may include code to receive a low-latency packet and an indicator in a self-contained wireless communication structure having a plurality of portions, wherein the indicator indicates adjusting of, based on scheduling of the low-latency packet, at least one uplink symbol to a downlink symbol, or at least one downlink symbol to an uplink symbol in the self-contained wireless communication structure, and further wherein the reception of the indicator precedes the reception of the low-latency packet, adjust one or more portions of the self-contained wireless communication structure based on the indicator, and transmit an acknowledgement message associated with the low-latency packet within the self-contained wireless communication structure.

Aspects generally include a method, apparatus, system, computer program product, non-transitory computer-readable medium, user equipment, wireless communication device, base station, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
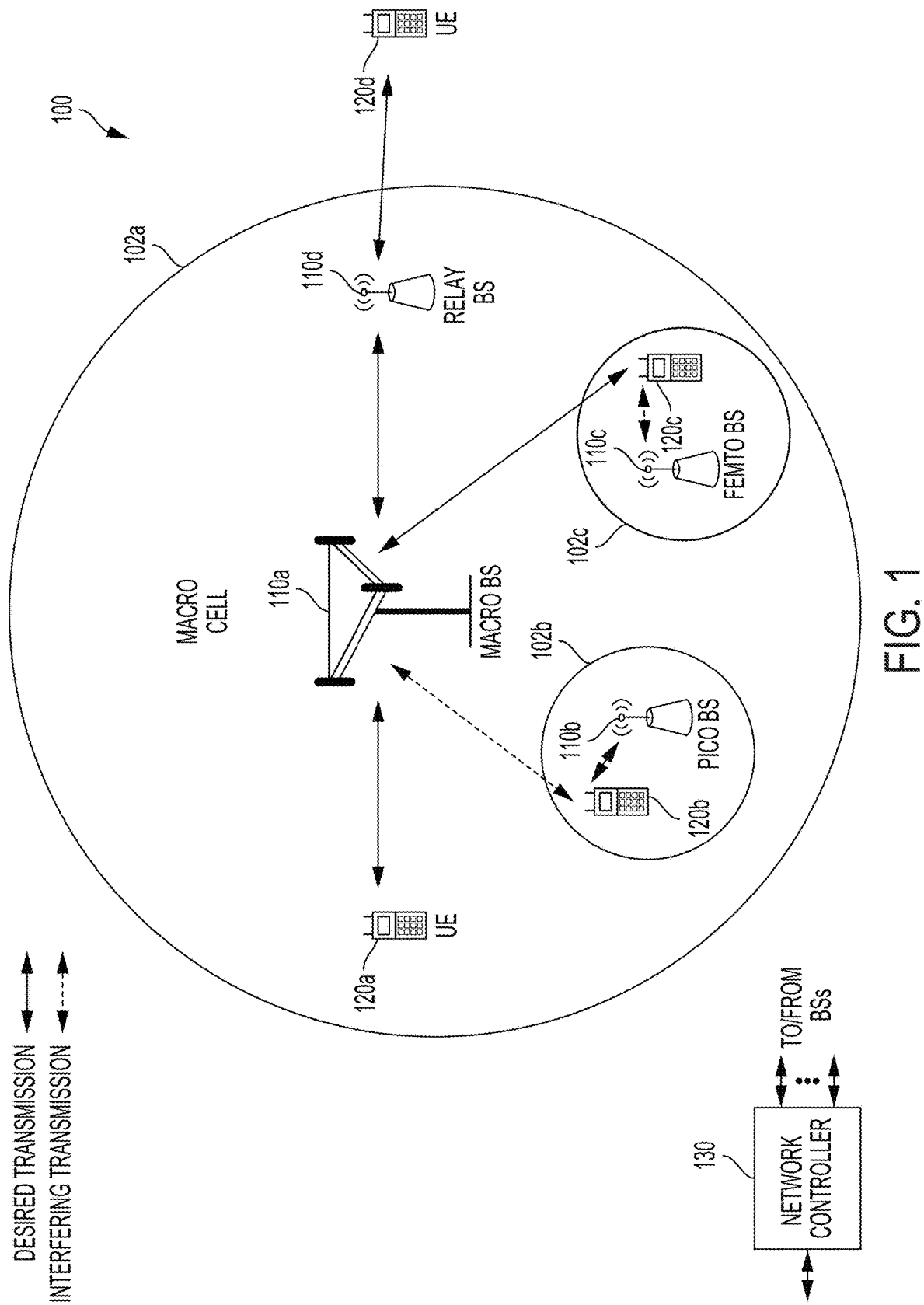
FIG. 1 is diagram illustrating an example of a wireless communication network in accordance with aspects of the present disclosure.

The detailed description set forth below in connection with the appended drawings is intended as a description of various configurations and is not intended to represent all the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

An access point ("AP") may comprise, be implemented as, or known as a NodeB, a Radio Network Controller ("RNC"), an eNodeB (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), a Node B (NB), a gNB, a 5G NB, a NR BS, a Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, and/or the like), medical devices or equipment, biometric sensors/devices, an entertainment device (e.g., music device, video device, satellite radio, gaming device, and/or the like), a vehicular component or sensor, smart meters/sensors, industrial manufacturing equipment, a global positioning system device, or any other suitable device that is configured to communicate via a wireless or wired medium.

In aspects, an access terminal (AT) may implement 5G New Radio (NR). Such an exemplary AT may be referred to herein as a NR UE. NR UEs may be implemented in a variety of configurations. For example, NR UEs may be configured as an Enhanced Mobile Broadband (eMBB) UEs employing service targeting wide bandwidth (e.g., 80 megahertz (MHz) and beyond). In aspects, such service may include, for example, voice, messaging and/or video streaming services similar to LTE communication. Additionally or alternatively, NR UEs may be configured as millimeter wave (mmW) UEs targeting high carrier frequency (e.g., 60 gigahertz (GHz)) communication. Additionally or alternatively, NR UEs may be configured as ultra reliable and low latency communications (URLLC) UEs using mission critical URLLC service. In aspects, such service may include, for example, factory automation, robotics, remote surgery, and/or autonomous driving. Additionally or alternatively, NR UEs may be configured as machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction.

MTC UEs may include UEs that are capable of MTC communications with MTC servers and/or other MTC devices through Public Land Mobile Networks (PLMN), for example.

Examples of MTC devices include sensors, meters, location tags, monitors, drones, robots/robotic devices, and/or the like. MTC UEs, as well as other types of UEs, may be implemented as NB-IoT (narrowband internet of things) devices. Additionally or alternatively, NR UEs may be configured as massive MTC (mMTC) UEs targeting non-backward compatible MTC techniques.

It is noted that while aspects may be described herein using terminology commonly associated with 3G and/or 4G wireless technologies, aspects of the present disclosure can be applied in other generation-based communication systems, such as 5G and later, including NR technologies.

In some aspects, the present disclosure is directed to supporting URLLC services over TDD. URLLC services may include transmission and reception of URLLC data. Such transmissions and receptions may often have low latency and high reliability requirements. Unfortunately, the nominal structure of an enhanced mobile broadband (eMBB) TDD subframe has several fundamental limitations that restrict the reliability and latency achievements that can be obtained. For example, although a nominal TDD subframe may be self-contained, in that it may contain a downlink (DL) interval and an uplink (UL) interval, in the nominal TDD subframe structure only one direction in downlink or uplink may be active at any time. This feature creates a self-blocking characteristic in the nominal TDD subframe structure. Thus, during uplink intervals, no downlink transmissions are possible. Similarly, during downlink intervals, no uplink transmissions are possible.

A deadline constraint for a transmission of URLLC data may exist. For example, a delay budget consisting of a particular period of time or number of symbols may be provided. Given the deadline constraint, URLLC data must be successfully delivered within the delay budget. Because of the self-blocking limitation of the nominal TDD subframe structure, a large nominal TDD subframe structure limits the number of possible URLLC data transmissions within the given delay budget and thus, the highest system reliability that may be achieved. As described below, the present disclosure provides a solution to these, and other problems, by providing a URLLC TDD frame configuration (e.g., subframe configuration) that takes into account the limitations of the nominal TDD subframe.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G NB, an access point, a TRP, and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with a service subscription. A pico cell may cover a relatively small geographic area and may allow unrestricted access by UEs with a service subscription. A femto cell may cover a relatively small geographic area (e.g., a home) and may allow restricted access by UEs having an association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE). Some UEs may be considered eMBB UEs, URLLC UEs, mmW UEs, MTC UEs, eMTC UEs, mMTC UEs, NB-IoT UEs, and/or the like.

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
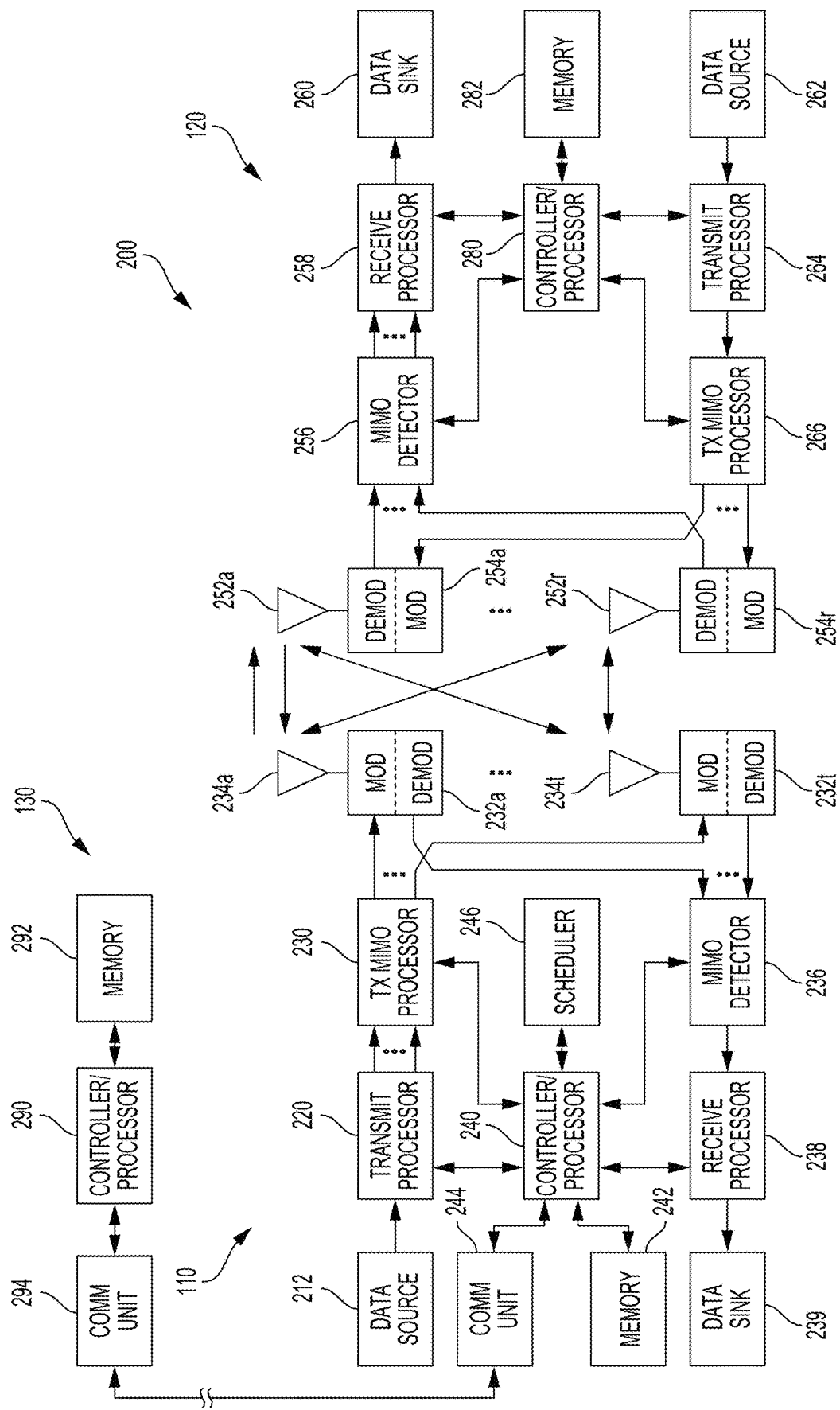
FIG. 2 is a diagram illustrating an example of a base station in communication with a user equipment (UE) in a wireless communication network in accordance with aspects of the present disclosure.

FIG. 2 shows a block diagram 200 of a design of base station 110 and UE 120, which may be one of the base stations and one of the UEs in FIG. 1 in accordance with aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at base station 110 and UE 120, respectively, to adjust wireless communication structure as described herein. For example, controller/processor 240 and/or other processors and modules at base station 110, may perform or direct operations of UE 120 to adjust a wireless communication structure in New Radio (NR). For example, controller/processor 240 and/or other controllers/processors and modules at BS 110 may perform or direct operations of, for example, method 1000 of FIG. 10, 1200 of FIG. 12, 1400 of FIG. 14 and/or other processes as described herein. In some aspects, one or more of the components shown in FIG. 2 may be employed to perform example methods and/or other processes for the techniques described herein. For example, controller/processor 280 and/or other processors and modules at UE 120, may perform or direct operations of base station 110 to adjust a wireless communication structure in New Radio. For example, controller/processor 280 and/or other controllers/processors and modules at UE 120 may perform or direct operations of, for example, method 1500 of FIG. 15 and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3:
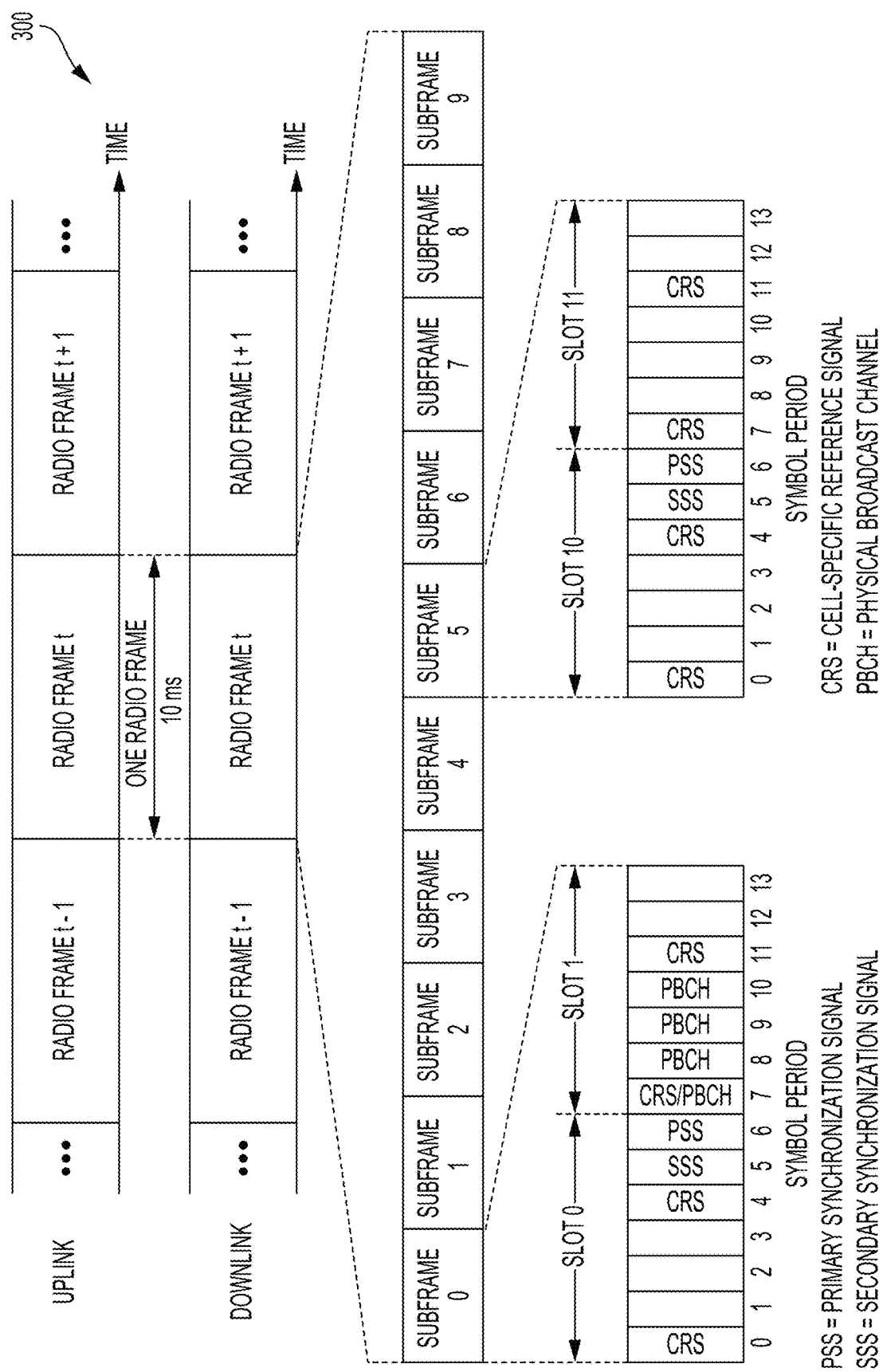
FIG. 3 is a diagram illustrating an example of a frame structure in a wireless communication network in accordance with aspects of the present disclosure.

FIG. 3 shows an example frame structure 300 for FDD in a telecommunications system (e.g., LTE) in accordance with aspects of the present disclosure. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to aspects of other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. In aspects of 5G NR, self-contained frame structure may include one or more subframes. As noted, as used herein, a self-contained frame structure refers to a structure that includes both one or more uplink portions and one or more downlink portions. Each subframe may include one or more slots. A subframe may include x OFDM symbols, and each slot may have a duration of y OFDM symbols, where x and y are integers. In aspects, y=x, y=x/2 and/or the like. In aspects, a value of y may signaled to a UE from a base station or a core network entity. In aspects, for frames including cyclic prefix overhead x=14 (e.g., a subframe includes 14 OFDM symbols.) Slots of duration y OFDM symbols in the numerology may be used for transmission. An integer number of slots may fit within one subframe duration (e.g., at least for subcarrier spacing is larger than or equal the reference numerology). The structure allows for control information at the beginning (e.g., of a subframe) only, for control information at the end (e.g., of a subframe) only, or for ctrl at the end and at the beginning (e.g., of a subframe). A mini-slot should at least support transmission shorter than y OFDM symbols in the numerology used for transmission. A mini-slot may include control information at the beginning and/or control information at the end (e.g., of the mini-slot). The smallest mini-slot may be the smallest possible scheduling unit (e.g., a smallest number of symbols).

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In aspects of other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
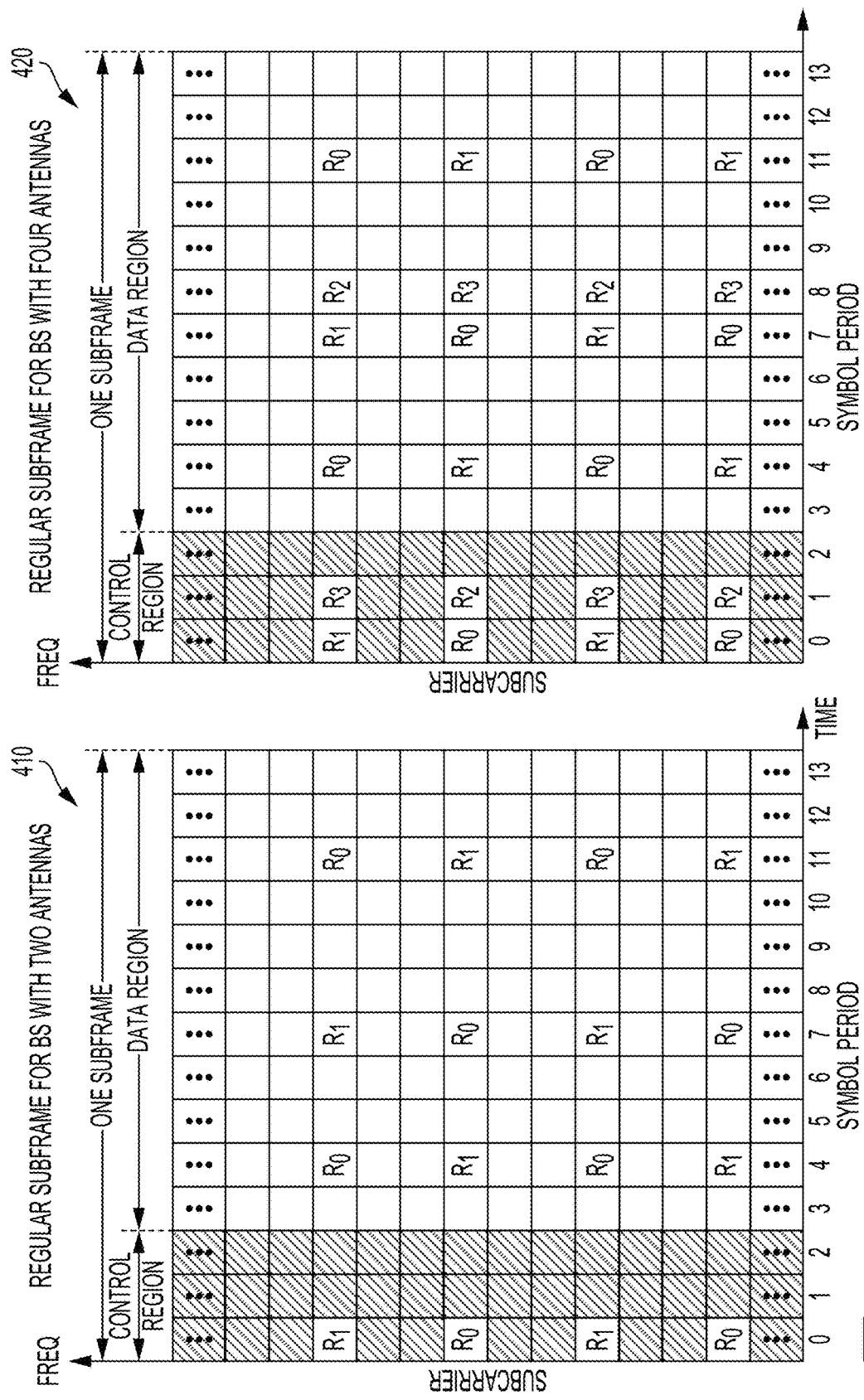
FIG. 4 is a diagram illustrating two example subframe formats with the normal cyclic prefix in accordance with aspects of the present disclosure.

FIG. 4 shows two example subframe formats 410 and 420 with the normal cyclic prefix in accordance with aspects of the present disclosure. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based at least in part on cell ID. CRS s may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, and/or the like, where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable and low latency communications (URLLC) service, for example.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 7 and 8.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
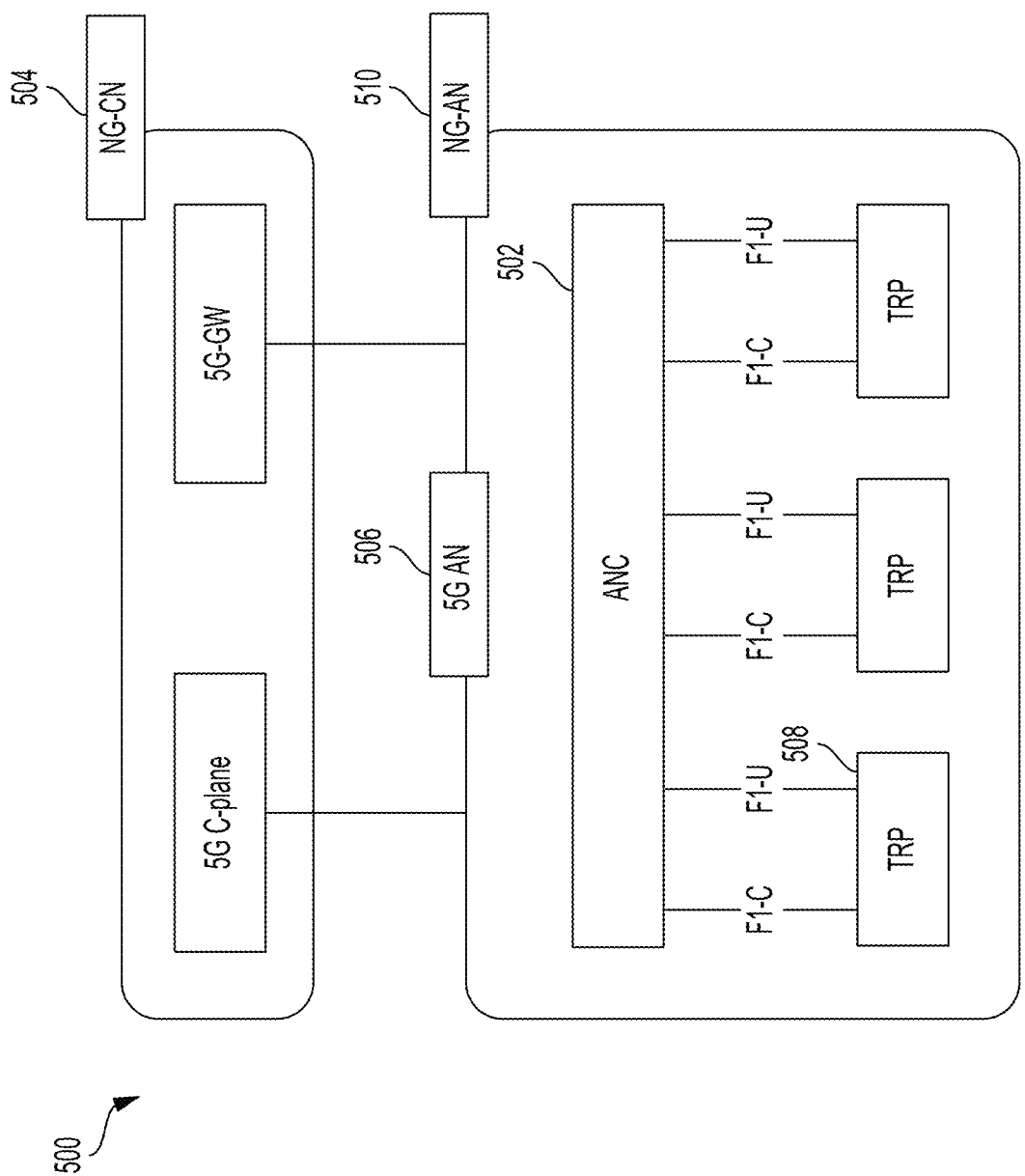
FIG. 5 is a diagram illustrating an example logical architecture of a distributed radio access network (RAN) in accordance with aspects of the present disclosure.

FIG. 5 illustrates an example logical architecture of a distributed RAN 500, according to aspects of the present disclosure. A 5G access node 506 may include an access node controller (ANC) 502. The ANC 502 may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The PDCP, RLC, MAC protocol may be adaptably placed at the ANC or TRP. According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
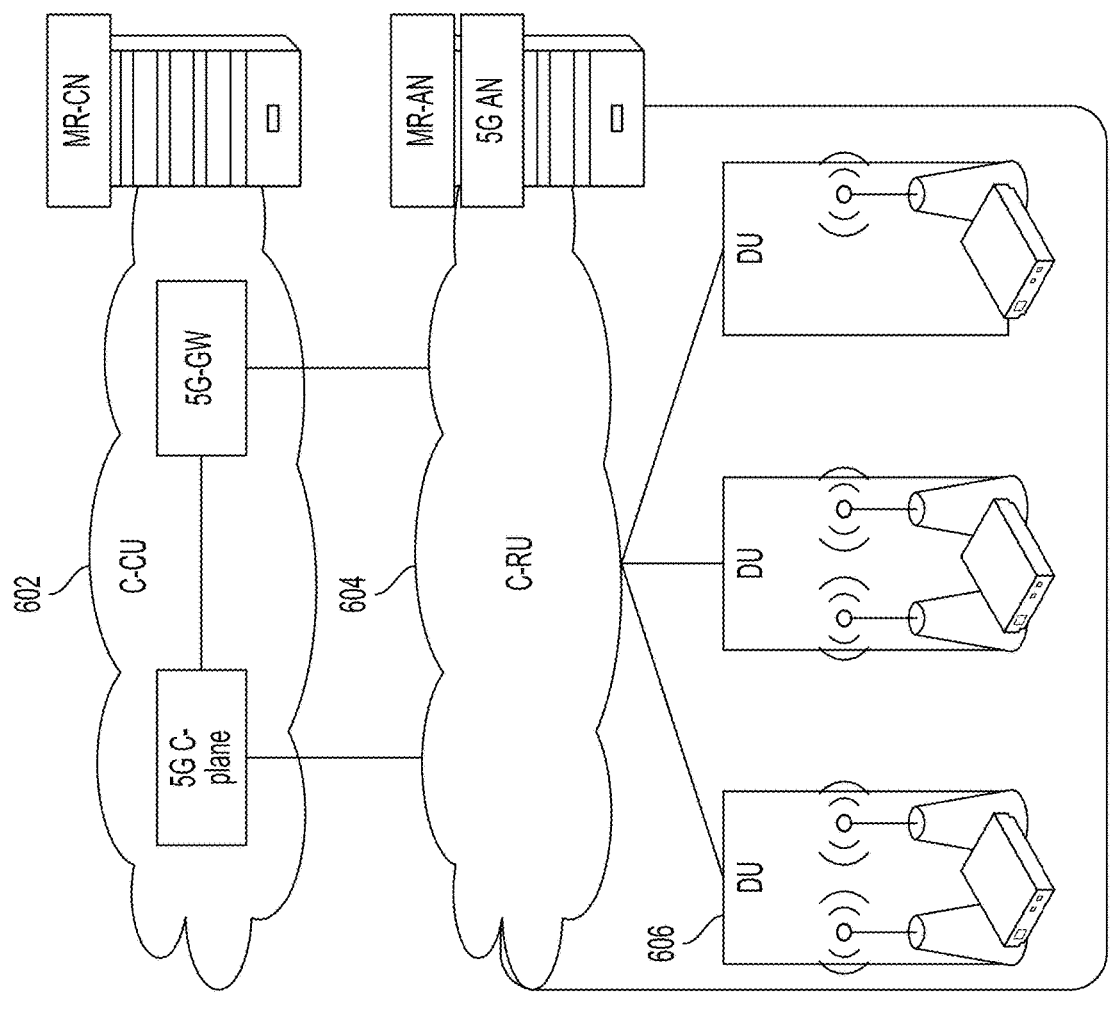
FIG. 6 is a diagram illustrating an example physical architecture of a distributed RAN in accordance with aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7:
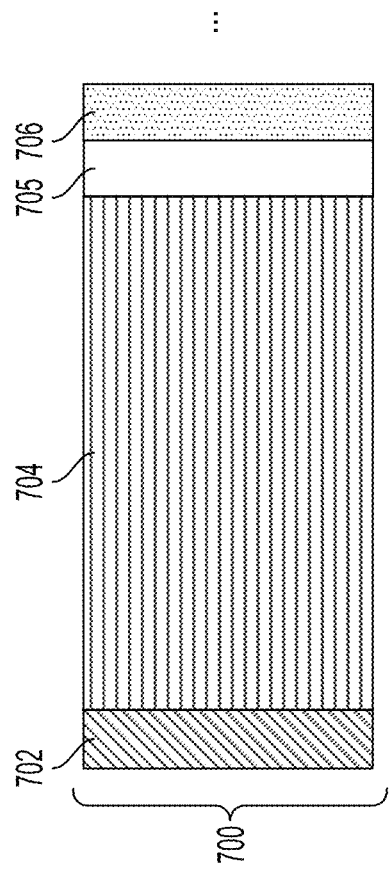
FIG. 7 is a diagram illustrating an example of a downlink (DL)-centric wireless communication structure in accordance with aspects of the present disclosure.

FIG. 7 is a diagram showing an example of a DL-centric subframe or wireless communication structure 700 in accordance with aspects of the present disclosure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric subframe. For example, the UL short burst portion 706 may include feedback information corresponding to the control portion 702 and/or the data portion 704. Non-limiting examples of information that may be included in the UL short burst portion 706 include an ACK signal (e.g., a Physical Uplink Control Channel (PUCCH) ACK, a Physical Uplink Shared Channel (PUSCH) ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This gap portion or time separation 705 may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)) and/or processing time. In this manner, the DL-centric subframe or wireless communication structure 700 is a self-contained DL-centric subframe or wireless communication structure. In aspects, the DL-centric subframe or wireless communication structure 700 may be associated with a time period of 14 symbols. In an exemplary arrangement, the control portion 702 may include one symbol, the DL data portion 704 may include 11 symbols, the gap portion or time separation 705 may include one symbol, and the UL short burst portion 706 may include one symbol. The DL-centric subframe or wireless communication structure 700 may be associated with one or more slots. For example, a first slot of the DL-centric subframe or wireless communication structure 700 may include the first 7 symbols, and a second slot of the DL-centric subframe or wireless communication structure 700 may include the remaining 7 symbols. The foregoing is merely one example of a DL-centric wireless communication structure, and alternative structures having similar features may exist without necessarily deviating from the aspects described herein.

As indicated above, FIG. 7 is provided merely as an example. Other examples are possible and may differ from what was described with regard to FIG. 7.

Figure 8:
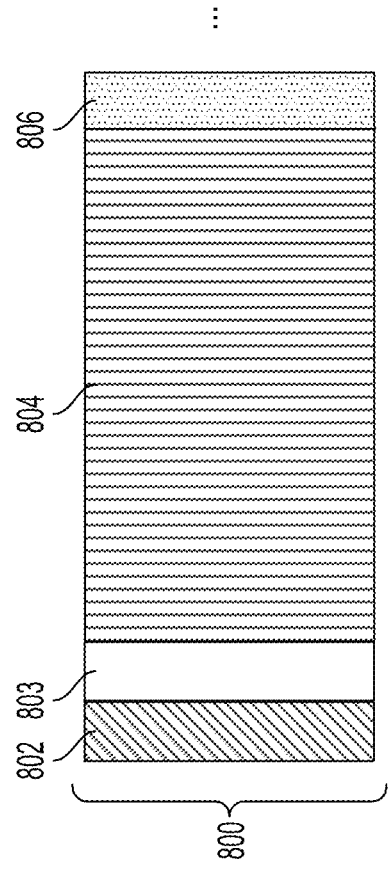
FIG. 8 is a diagram illustrating an example of an uplink (UL)-centric wireless communication structure in accordance with aspects of the present disclosure.

FIG. 8 is a diagram showing an example of an UL-centric subframe or wireless communication structure 800 in accordance with aspects of the present disclosure. The UL-centric subframe may include a control portion 802. The control portion 802 may exist in the initial or beginning portion of the UL-centric subframe. The control portion 802 in FIG. 8 may be similar to the control portion 702 described above with reference to FIG. 7. In some configurations, the control portion 802 may be a physical DL control channel (PDCCH).

The UL-centric subframe may also include an UL long burst portion 804. The UL long burst portion 804 may sometimes be referred to as the payload of the UL-centric subframe. The UL portion may refer to the communication resources utilized to communicate UL data from the subordinate entity (e.g., UE) to the scheduling entity (e.g., UE or BS).

As illustrated in FIG. 8, the end of the control portion 802 may be separated in time from the beginning of the UL long burst portion 804. This gap period or time separation 803 may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity) and/or processing time.

The UL-centric subframe may also include an UL short burst portion 806. The UL short burst portion 806 in FIG. 8 may be similar to the UL short burst portion 706 described above with reference to FIG. 7, and may include any of the information described above in connection with FIG. 7. In aspects, the UL-centric subframe or wireless communication structure 800 may be associated with a time period of 14 symbols. In an exemplary arrangement, the control portion 802 may include one symbol, the gap period or time separation 803 may include one symbol, the UL long burst portion 804 may include 11 symbols, and the UL short burst portion 806 may include one symbol. The UL-centric subframe or wireless communication structure 800 may be associated with one or more slots. For example, a first slot of the UL-centric subframe or wireless communication structure 800 may include the first 7 symbols, and a second slot of the UL-centric subframe or wireless communication structure 800 may include the remaining 7 symbols. In this manner, UL-centric subframe or wireless communication structure 800 may be a self-contained UL-centric subframe or wireless communication structure. The foregoing is merely one example of an UL-centric wireless communication structure and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which may use an unlicensed spectrum). In aspects, communication between or among a UE 120 and the BS 110 may communicate using sidelink signals. As described herein, a sidelink is a communication link by which data is transferred between the two or more UEs 120.

In some aspects, a wireless communication structure, such as a frame, for example, may include both UL-centric subframes and DL-centric subframes. In these aspects, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 8 is provided merely as an example. Other examples are possible and may differ from what was described with regard to FIG. 8. A BS 110 may provide a cell, and may schedule communications with UEs 120 located within the cell. Some communications may be associated with a higher reliability requirement and/or a lower latency requirement than other communications. For example, URLLC may be implemented as part of NR, and may have higher reliability requirements and/or lower latency requirements than other traffic associated with NR (e.g., enhanced mobile broadband (eMBB) traffic, sidelink traffic between two or more UEs 120, and/or the like) and/or traffic not associated with NR (e.g., LTE traffic and/or the like). When the BS 110 receives URLLC traffic (e.g., from an application layer to a lower layer of the BS 110), the BS 110 may provide the URLLC traffic in accordance with reliability requirements and/or latency requirements of the URLLC traffic, which may lead to interruption or puncturing of other traffic in the cell.

The usage of URLLC traffic is likely to increase as implementation of NR proceeds. In aspects, URLLC traffic may be unicast, multicast and/or broadcast communication between one or more UEs 120 and a base station. To improve communication in a cell associated with such URLLC traffic, communication using adjusted versions of wireless communication structure (e.g., an adjusted version of an DL-centric subframe or wireless communication structure 700 and/or an UL-centric subframe or wireless communication structure 800) are employed as described below with reference to FIGS. 9-18.

Communication between one or more UEs 120 and a base station 110 in a cell may employ eMBB traffic (e.g., or other non-URLLC traffic) using the wireless communication structure 700 and/or wireless communication structure 800 as described in connection with FIGS. 7 and 8, for example. In some aspects, such traffic may use a time division duplexing (TDD) configuration. In some aspects, URLLC traffic may be associated with a shorter transmission time interval (TTI) than eMBB traffic (e.g., or other non-URLLC traffic). For example, the URLLC traffic may be be associated with a scheduling granularity on one symbol, two symbols, four symbols, a mini-slot, and/or the like, whereas the non-URLLC traffic may have a larger scheduling granularity like a one wireless communication structure 700, 800 and/or the like.

When a BS 110 is communicating with one or more UEs 120 in a particular cell using eMBB or other non-URLLC communication, and when the BS 110 receives URLLC traffic to be provided to a URLLC UE 120 (e.g., which may or may not be one of the UEs 120 communicating using eMBB or other non-URLLC communication), the BS 110 may puncture eMBB or other non-URLLC communications of the UEs 120 to provide the URLLC traffic in accordance with URLLC requirements. For example, if the non-URLLC communications are not punctured, the non-URLLC communications may create interference with the URLLC traffic, thereby causing decoding of the URLLC traffic to fail.

Techniques and apparatuses, described herein, adjust (e.g., dynamically) wireless communication structure associated with communication in a cell, thereby reducing interference associated with the URLLC traffic (e.g., in the same or a different cell).

Figure 9:
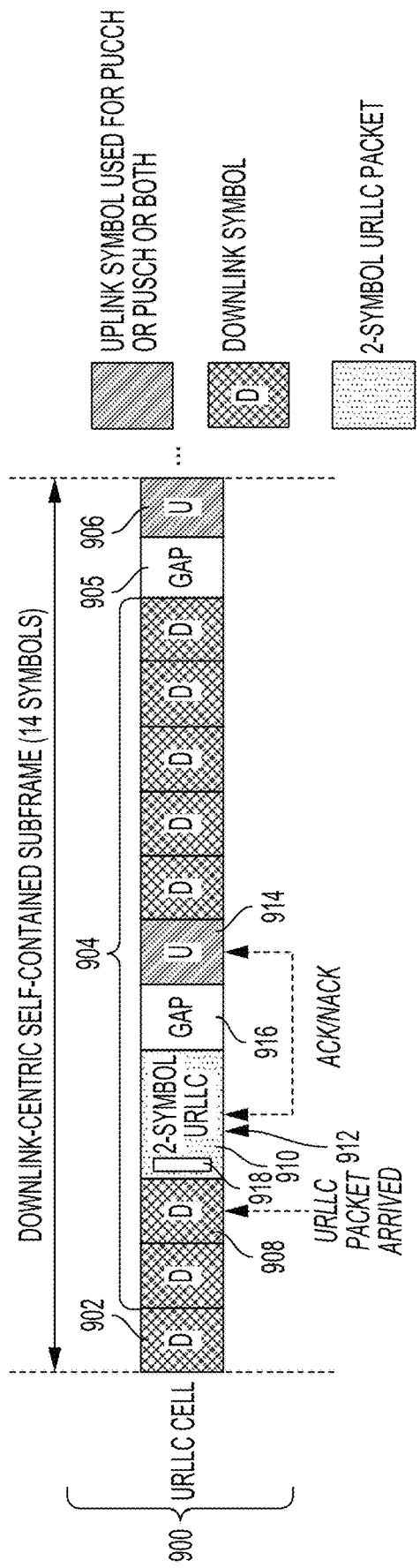
FIG. 9 is a diagram illustrating a first example of adjusting wireless communication structure in accordance with aspects of the present disclosure.

FIG. 9 is a diagram illustrating a first example of an exemplary subframe that has its wireless communication structure adjusted, in accordance with aspects of the present disclosure. The wireless communication structure 900 may initially be similar to the DL-centric subframe or wireless communication structure 700. For example, the communication structure 900 may initially include a control portion 902, a data portion 904, a gap portion or time separation 905 and a UL short burst portion 906 similar to the control portion 702, downlink data portion 704, gap portion or time separation 705, and UL short burst portion 706, respectively, of the DL-centric subframe or wireless communication structure 700. However, as shown, in the wireless communication structure 900 one or more portions (e.g., of one or more symbols) have been adjusted (e.g., dynamically) from the DL-centric subframe or wireless communication structure 700. For example, as shown, DL data portion 904 has been adjusted such that one or portions of data portion 904 have been adjusted from a downlink portion to an uplink portion (e.g., portion 914). Additionally, as shown, one or more portions of the wireless communication structure 900 has been adjusted from a downlink portion to a gap portion 916.

More specifically, as illustrated in FIG. 9, data portion 904 may be divided into a plurality of portions, which in this example, may be symbols. Additionally, wireless communications structure 900 may be divided into two slots where the first 7 symbols of structure 900 comprise the first slot and the second 7 symbols comprise the second slot, such as was discussed above with reference to FIGS. 7 and 8. Initially, all the symbols of data portion 904 may be configured for communicating downlink data (e.g., the base station transmitting and the UE receiving the downlink data). However, as shown and will be discussed in more detail below, one or more of these symbols may be reconfigured for communicating a low-latency packet (e.g., URLLC communication 910), uplink data (e.g., symbol 914) or as a gap (e.g., symbol 916). Although FIG. 9 illustrates one example for adjusting one or more portions of a DL data portion, it should be understood that in aspects, one or portions of a DL data portion 904, which may be similar to the DL data portion 704, of the wireless communication structure 900 may be adjusted in different manners.

For example, a base station 110 of a particular cell may be communicating with one or more UEs 120 using non-URLLC communication such as eMBB communications, for example. The BS 110 may employ the DL-centric subframe or wireless communication structure 700. However, during such communication, for example, during the third symbol 908, the BS 110 may receive (e.g., from an application layer of the BS 110 to a lower layer like a physical layer of the BS 110) a low-latency packet, such as a URLLC packet, for communication. As used herein, the term low-latency packet refers to a packet that is delay sensitive, such as, for example, a packet that the base station is to deliver to the UE with less delay than a standard packet. One example of a low latency packet is a URLLC packet. For ease in description, the following description will be discussed with reference to URLLC packets. It, however, should be understood that the presently discussed examples are equally applicable to other types of low-latency packets.

In response to receiving the URLLC packet, rather than continue communicating using the DL-centric subframe or wireless communication structure 700, the BS 110 may preempt and/or puncture any non-URLLC traffic associated with one or more subsequent symbols to transmit the URLLC traffic communication. As shown, for example, the BS 110 pre-empts and/or punctures the non-URLLC traffic, and transmits a URLLC communication 910 to a URLLC UE 120, for example, in the cell. As shown, URLLC communication 910 may occupy two symbol periods of data portion 904. The URLLC communication 910 may have a mini-slot 912 structure, the mini-slot structure being smaller than a slot structure associated with wireless communication structures 900, 700. The mini-slot structure may be aligned with a boundary of a portion (e.g., a symbol) of the with wireless communication structures 900, 700. As will be discussed in more detail below, in one example, the mini-slot structure may be a 2 symbol structure where a first symbol is used for communicating an indication that the frame structure has been adjusted (e.g., the below discussed SFI) and the second symbol may be used for communicating the URLLC packet. It should, however, be understood that in other examples other structures may be used (e.g., the indication may be one or more symbols and the URLLC packet may be one or more symbols).

In an aspect, the URLLC UE 120 is to communicate an acknowledgment message (e.g., from the URLLC UE to the BS 110) associated with the a URLLC communication 910. However, communication of such acknowledgment message in the UL short burst portion 906 may not meet latency constraints of URLLC. To avoid having to wait until the UL short burst portion 906, in aspects, the BS adjusts one or more portions of the DL data portion 904. For example, a seventh symbol 914 of the wireless communication structure 900 may be adjusted from a downlink symbol to an uplink symbol. Although a larger or smaller portion and/or different portion of the wireless communication structure 900 may be adjusted in this manner. A sixth symbol 916 of the wireless communication structure 900 may be adjusted from a downlink symbol to gap portion. Although a larger or smaller portion and/or different portion of the wireless communication structure 900 may be adjusted in this manner. In this manner, in aspects, two DL symbols right after the scheduled URLLC mini-slot are converted respectively into a gap symbol and an UL symbol. The acknowledgment message associated with the a URLLC communication 910 may be communicated in such seventh symbol 914.

In aspects, the BS 110 may communicate an indicator 918 to inform one or more network entities (e.g., UEs 120) in the cell that the BS 110 is adjusting the wireless communication structure. As shown, indicator 918 may be located at the beginning of URLLC communication 910. Indicator 918 may be referred to herein as adjustment indicator 918 and network entities may adjust communications based on the adjustment indicator. In this manner, a latency between communication of the URLLC communication 910 and the acknowledgment message associated therewith may be reduced and/or eliminated.

In aspects, the indicator 918 may include a super-fast subframe indicator (SFI). The SFI may be included in and/or associated with a URLLC communication mini-slot 912. For example, the indicator 918 may be associated with a control portion (e.g., PDCCH portion of the mini-slot 912), used for scheduling URLLC, of the mini-slot 912. In aspects, the indicator 918 may be aligned with a mini-slot structure, for example, aligned with a 2-, 4-, or 7-symbol boundary within a wireless communication structure or subframe 900. One or more UEs 120 in a cell may monitor (e.g., with a frequency or periodicity) for the indicator 918, and adjust communication (e.g., transmit and/or receive) behavior based on the adjusted wireless communication structure 900. For example, all UEs associated with URLLC and other (e.g., eMBB) traffics may monitor for the indicator 918 of the communication structure adjusting or change in every mini-slot or once every few mini-slots, and then adapt their transmit (tx) or receiver (rx) behavior according to the new defined frame structure (e.g., including the adjusted wireless communication structure 900). In aspects, a frequency with which the indicator 918 is monitored for and/or the periodicity of indicator monitoring is configurable. As noted, in an example, the mini-slot structure for sending the URLLC communication may be a 2 symbol mini-slot structure, where for example, the first symbol is for sending the indicator 918 and the second symbol of the mini-slot structure is for sending a one symbol URLLC packet. In other words, the indicator 918 may be transmitted at the beginning of URLLC communication 910 and the URLLC packet may be transmitted immediately after the indicator 918 such that the URLLC packet occupies the remaining portion of the URLLC portion.

In other examples the URLLC communication may be different sizes. In one such example that will be discussed with reference to FIG. 9, the URLLC communication 910 may occupy three symbols. In such an example, the first 2 symbols of data portion 904 are used for non-low latency traffic (e.g., eMBB); the third symbol of data portion 904 may be used for sending the SFI, indicating that the fourth and fifth symbols of data portion 904 are for communicating low latency data (e.g., a 2-symbol URLLC packet); the sixth symbol of data portion 904 may be used as a gap portion 916; the seventh symbol of data portion 904 may be used for uplink data (e.g., uplink symbol 914); and the remaining symbols of data portion may be used for as per the default configuration, communicating non low latency (e.g., eMBB) data. Thus, in this example, URLLC communication 910 uses a 3 symbol mini-slot structure where the first symbol of the mini-slot structure is used for communicating the SFI and the second and third symbol of the mini-slot structure are used for communicating a 2 symbol length URLLC packet. Although in this example, the URLLC packet is discussed with reference to a 2 symbol URLLC packet and the SFI is discussed as a one symbol SFI, it should be understood that in other configurations different sizes may be used. For example, the URLLC packet could be one, two, or three or more symbols. Further, the SFI could be one or more symbols.

In aspects, the adjusting or change of the wireless communication or subframe structure can apply to (1) the current subframe (e.g., in which the indicator is communicated) only; (2) all subsequent subframes; or (3) a few subsequent subframe before expiry of a time period or a timer expires. Radio resource control (RRC) signaling may be employed to inform one or more UEs of a selected one of such options of how subframe(s) are changed. In aspects using a "timer," the timer may be based on a configurable parameter that may be dynamically or semi-statically determined and/or communicated by a base station, such as a gNB.

Thus, as described, if needed, a base station (e.g., a gNB) can adaptively redefine a default frame structure to create a subsequent frame structure or one or more subsequent portions of the frame structure with the objective to enhance URLLC service. For a DL-centric self-contained subframe, when DL mini-slot-based URLLC packet is scheduled, a BS can redefine the subsequent frame structure to enable communication of a positive acknowledgment (ACK) or negative acknowledgement (NACK) in an acknowledgment message that meets URLLC latency requirements (e.g., a fast ACK/NACK turnaround). When a mini-slot-based URLLC packet is scheduled, an indicator 918 can be used to change or effect change of the subsequent subframe or frame structure. For example, in DL-centric subframe or frame, one or a few DL data symbols can be converted into UL symbols for fast ACK/NACK reporting (e.g., by a URLLC UE 120 to the base station 110).

Figure 10:
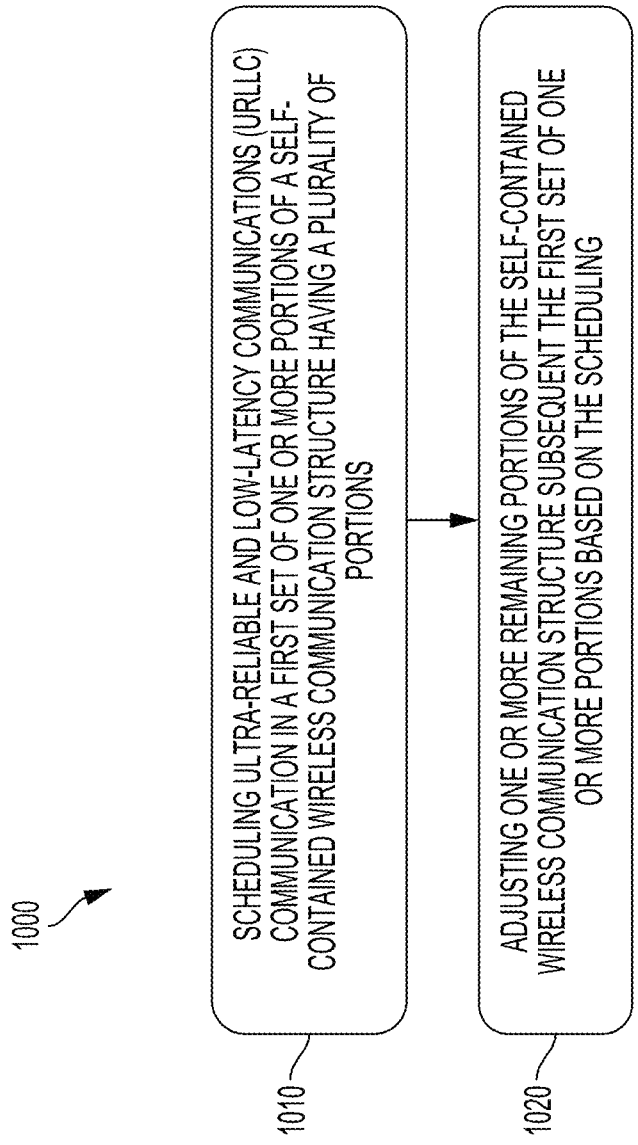
FIG. 10 is a flow chart of a first method of adjusting (e.g., dynamically) wireless communication structure in accordance with aspects of the present disclosure.

FIG. 10 is a flow chart of a first method of adjusting (e.g., dynamically) wireless communication structure in accordance with aspects of the present disclosure. The method may be performed by a base station (e.g., the BS 110 of FIG. 1, the apparatus 1600, and/or the like).

At 1010, the BS 110 may schedule a low-latency communication (e.g., an ultra-reliable and low-latency communications (URLLC) communication) in a first set of one or more portions of a self-contained wireless communication structure having a plurality of portions. For example, the BS 110 may employ the mini-slot 912 structure to schedule a URLLC communication with a UE 120.

At 1020, the BS 110 may adjust one or more remaining portions of the self-contained wireless communication structure subsequent the first set of one or more portions based on the scheduling. For example, one or more portions (e.g., symbols or portions thereof) of the wireless communication structure 900, such as a DL data portion may be adjusted from a downlink portion to an uplink portion. Additionally, one or more portions (e.g., symbols or portions thereof) of the wireless communication structure 900 may be adjusted from a downlink portion to a gap portion. In aspects, adjusting one or more remaining portions of the self-contained wireless communication structure subsequent the first set of one or more portions includes increasing a number of uplink symbols associated with the one or more remaining portions of the self-contained wireless communication structure subsequent the first set of one or more portions to facilitate communication of an acknowledgement message. In such aspects, the acknowledgement message is associated with the URLLC communication. In aspects, adjusting one or more remaining portions of the self-contained wireless communication structure subsequent the first set of one or more portions includes adjusting one or more remaining portions of the self-contained wireless communication structure subsequent the first set of one or more portions to facilitate communication of an acknowledgement message in at least one portion other than a last portion of the wireless communication structure. In such aspects, the acknowledgement message is associated with the URLLC communication.

In aspects, one or more slot structures of the self-contained wireless communication structure are defined by the plurality of portions, the first set of one or more portions is based on a mini-slot structure, wherein a mini-slot structure is smaller than a slot structure, scheduling the URLLC communication in the first set of one or more portions of the self-contained wireless communication structure includes scheduling the URLLC communication using the mini-slot structure in the self-contained wireless communication structure, and adjusting one or more remaining portions of the self-contained wireless communication structure subsequent the first set of one or more portions includes transmitting an indicator associated with the adjusting in or corresponding to the mini-slot structure. In such aspects, the indicator is aligned with a boundary of the mini-slot structure. In such further aspects, the mini-slot structure is aligned with a boundary of a portion.

In aspects, the self-contained wireless communication structure includes one or more self-contained wireless communication subframes. In aspects, adjusting one or more remaining portions of the self-contained wireless communication structure includes at least one of adjusting one or more portions of the self-contained wireless communication structure remaining in at least a current subframe in which the indicator is transmitted, adjusting one or more portions of one or more remaining subframes of the self-contained wireless communication structure based on a time period, or adjusting one or more portions of all remaining subframes of the self-contained wireless communication structure. In such aspects, the method 1000 further comprises indicating the time period to one or more user equipments using dynamic signaling or semi-static signaling. In such aspects, the method 1000 further comprises indicating to one or more user equipments whether adjusting includes adjusting one or more portions of the self-contained wireless communication structure remaining in at least a current subframe in which the indicator is transmitted, adjusting one or more portions of one or more remaining subframes of the self-contained wireless communication structure based on a time period, or adjusting one or more portions of all remaining subframes of the self-contained wireless communication structure. In aspects, each portion of the plurality of portions is associated with a respective symbol.

In aspects, the self-contained wireless communication structure includes at least one downlink-centric self-contained subframe. In such aspects, wherein adjusting one or more remaining portions of the self-contained wireless communication structure subsequent the first set of one or more portions includes adjusting at least one downlink symbol of the at least one downlink-centric self-contained subframe subsequent the first set of one or more portions to an uplink symbol or to a symbol having at least an uplink portion to facilitate communication of an acknowledgement message in the uplink symbol. In such further aspects, adjusting at least one downlink symbol of the at least one downlink-centric self-contained subframe subsequent the first set of one or more portions to an uplink symbol or to a symbol having at least an uplink portion to facilitate communication of an acknowledgement message in the uplink symbol includes adjusting a first downlink symbol of the at least one downlink-centric self-contained subframe subsequent the first set of one or more portions to a gap symbol and adjusting a second downlink symbol of the at least one downlink-centric self-contained subframe subsequent the first set of one or more portions to an uplink symbol. In such further aspects, the acknowledgement message is associated with the URLLC communication.

In aspects, one or more slot structures of the self-contained wireless communication structure are defined by the plurality of portions, and the first set of one or more portions is based on a mini-slot, wherein a mini-slot structure is smaller than a slot structure. In such aspects, scheduling associated with URLLC communication is based on the mini-slot structure, and scheduling associated with another type of communication (e.g., a non-URLLC communication like an eMBB communication) is based on the one or more slots.

Although FIG. 10 shows example blocks of a method of wireless communication, in some aspects, the method may include additional blocks, fewer blocks, different blocks, or differently arranged blocks than those shown in FIG. 10. Additionally, or alternatively, two or more blocks shown in FIG. 10 may be performed in parallel.

Figure 11:
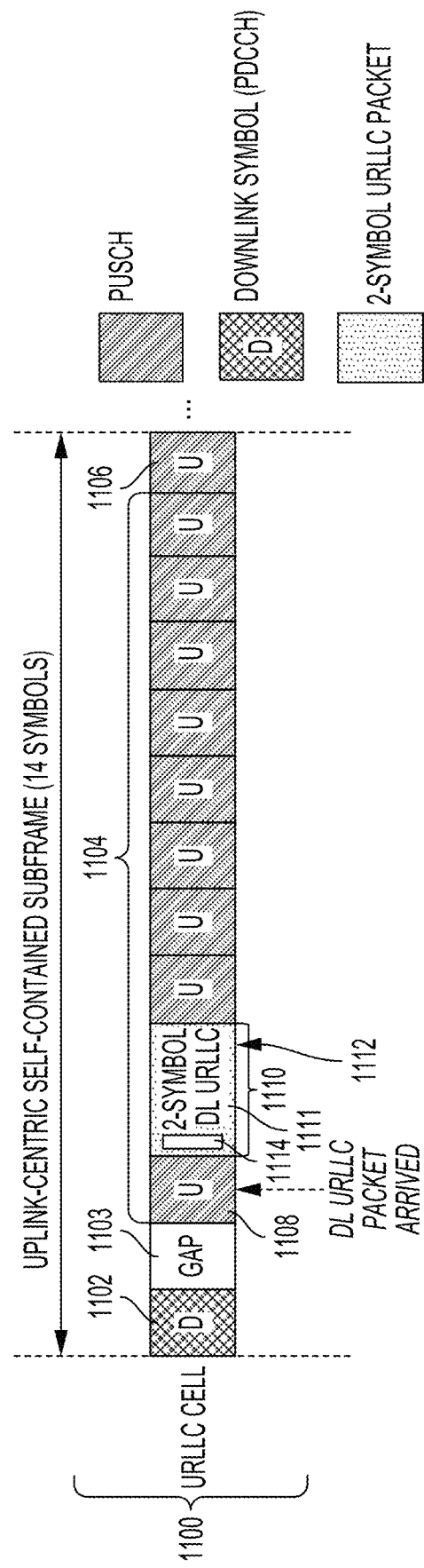
FIG. 11 is a diagram illustrating another example of adjusting wireless communication structure in accordance with aspects of the present disclosure.

FIG. 11 is a diagram illustrating another exemplary subframe that has an adjusted wireless communication structure in accordance with aspects of the present disclosure. The wireless communication structure 1100 may be similar to the UL-centric subframe or wireless communication structure 800. For example, the communication structure 1100 may include a control portion 1102, a gap portion or time separation 1103, a data portion 1104, and a UL short burst portion 1106 similar to the control portion 802, gap portion or time separation 803, data portion 804, and UL short burst portion 806, respectively, of the UL-centric subframe or wireless communication structure 800. However, in the wireless communication structure 1100 one or more portions (e.g., of one or more symbols) of the structure have been adjusted (e.g., dynamically) from the UL-centric subframe or wireless communication structure 800. Additionally, wireless communications structure 1100 may be divided into two slots where the first 7 symbols of structure 1100 comprise the first slot and the second 7 symbols comprise the second slot, such as was discussed above with reference to FIGS. 7 and 8.

In accordance with this aspect, one or more portions of the wireless communication structure 1100, such as a UL data portion 1104 may be adjusted from an uplink portion to a downlink portion or gap portion. For example, as shown, one or more portions of a UL data portion 1104, which may be similar to the UL data portion 804, of the wireless communication structure 1100 has been adjusted for use in communicating one or more low-latency packets (e.g., URLLC packet(s)). For ease in description, this example will be discussed with reference to URLLC packets, however, it should be understood that in other examples other types of low-latency packets may be used.

For example, a base station 110 of a particular cell may be communication with one or more UEs 120 using non-URLLC communication. This non-URLLC communications may be, in this example, eMBB communications or any other type of non-URLLC communication. The BS 110 may employ an UL-centric subframe or wireless communication structure, such as wireless communication structure 800 of FIG. 8. As shown, data portion 1104 may include one or more portions, which in this example, may be one or more symbol periods. In this example, during such communication, for example, during the third symbol 1108, the BS 110 may receive (e.g., from an application layer of the BS 110 to a lower layer like a physical layer of the BS 110) a URLLC packet for communication. In response, rather than continue communicating using the UL-centric subframe or wireless communication structure 800, the BS 110 may preempt and/or disregard any non-URLLC traffic associated with one or more subsequent symbols to transmit the URLLC traffic communication. For example, the BS 110 may pre-empt and/or disregard UL non-URLLC traffic. The BS 110 may adjust one or more portions of the UL data portion 1104 from uplink portion(s) to downlink portion(s). For example, as illustrated, the BS 110 may adjust the fourth and fifth symbols 1110 from UL symbols to downlink symbols. The BS 110 may then, for example, transmit a URLLC communication 1111, for example, to a URLLC UE 120 in the cell using the adjusted portion 1110 (e.g., the $4^{th}$ and $5^{th}$ symbols of wireless structure 1100). The URLLC communication 1111 may have a mini-slot 1112 structure, the mini-slot structure being smaller than a slot structure associated with wireless communication structures 1100, 800. The mini-slot structure may be aligned with a boundary of a portion (e.g., a symbol) of the wireless communication structures 1100, 800.

The URLLC UE 120 may be configured to communicate an acknowledgment message (e.g., from the URLLC UE to the BS 110) associated with the a URLLC communication 1111. Communication of such acknowledgment message may occur in one or more subsequent portions of the wireless communication structures 1100 to meet URLLC delay constraints without adjusting the structure of such subsequent portions since they are all uplink portions (e.g., symbols).

In aspects, the BS 110 may communicate an indicator 1114 to inform one or more network entities (e.g., UEs 120) in the cell that the BS 110 is adjusting the wireless communication structure. Such network entities may adjust communications based on an indicator 1114 of the adjusting, which may be referred to as adjustment indicator 1114. In this manner, a latency between communication of the URLLC communication 910 and the acknowledgment message associated therewith may be reduced and/or eliminated.

Additionally or alternatively, interference (e.g., device-to-device interference) in the cell may be reduced and/or eliminated.

In aspects, the indicator 1114 may include a super-fast subframe indicator (SFI). The SFI may be included in and/or associated with a URLLC communication mini-slot 1112. For example, the indicator 1114 may be associated with a control portion (e.g., downlink control information (DCI) carried over a PDCCH portion), used for scheduling URLLC, of the of the mini-slot 1112. In aspects, the indicator 1114 may be aligned with a mini-slot structure, for example, aligned with a 2-, 4-, or 7-symbol boundary within a wireless communication structure or subframe 1100. One or more UEs 120 in a cell may monitor (e.g., with a frequency or periodicity) for the indicator 1114, and adjust communication (e.g., transmit and/or receive) behavior based on the adjusted wireless communication structure 1100. For example, all UEs unscheduled for URLLC and other (e.g., eMBB) traffics in the mini-slot 1112 may monitor for the indicator 1114 of communication structure adjusting or change, and then adapt their transmit (tx) or receive (rx) behavior according to the new defined frame structure (e.g., including the adjusted wireless communication structure 1100). If needed, one or more such UEs may suspend any scheduled UL transmission in one or more subsequent portions or mini-slots associated with the wireless communications structure 1100. While this may reduce interference from UEs able to monitor for the indicator 1114, some UEs 120 in the cell, for example, UEs which are scheduled to transmit during mini-slot 1112, are unable to monitor for the indicator 1114 due to the potentially-ongoing transmissions by the UEs and given the half-duplex nature of the communications. Consequently such UEs may cause interference (e.g., D2D interference) in the cell. In aspects, the present methods and apparatus may mitigate, reduce and/or eliminate such interference. For example, a non-URLLC UE 120 (e.g., an eMBB UE 120) or a UE 120 currently associated with non-URLLC communication (e.g., eMBB communication) can be configured to and/or use less output or transmit power for UL transmission if such UE 120 is (e.g., if such UE 120 has determined it is) in the proximity of one or more URLLC UEs.

In aspects, a frequency with which the indicator 1114 is monitored for and/or the periodicity of indicator monitoring is configurable. In aspects, the adjusting or change of the wireless communication structure or subframe can apply to (1) the current subframe (e.g., in which the indicator is communicated) only; (2) all subsequent subframes; or (3) a few subsequent subframe before expiry of a time period or a timer expires. Radio resource control (RRC) signaling may be employed to inform one or more UEs of a selected one of such options of how subframe(s) are changed. In aspects, an example of the so-called "timer" can be based on a configurable parameter dynamically or semi-statically determined and/or communicated by a base station, such as a gNB.

Thus, for UL-centric self-contained subframes, if a base station needs to schedule an URLLC communication (e.g., schedule a DL mini-slot-based URLLC packet), the BS 110 may convert one or more uplink portions (e.g., UL symbols) to downlink portions (e.g., DL symbols) of the wireless communication structure 1100 for URLLC transmission, for example, without muting on-going uplink transmissions. The base station may disregard such uplink transmission and rely on retransmission thereof. If a URLLC communication (e.g., a DL mini-slot-based URLLC packet) needs to be scheduled in an UL self-contained subframe, a base station like a gNB may convert the UL symbols to DL symbols for URLLC transmission, and effect such conversion (e.g., by one or more network entities) throughout the cell by broadcasting an SFI-based indicator.

Figure 12:
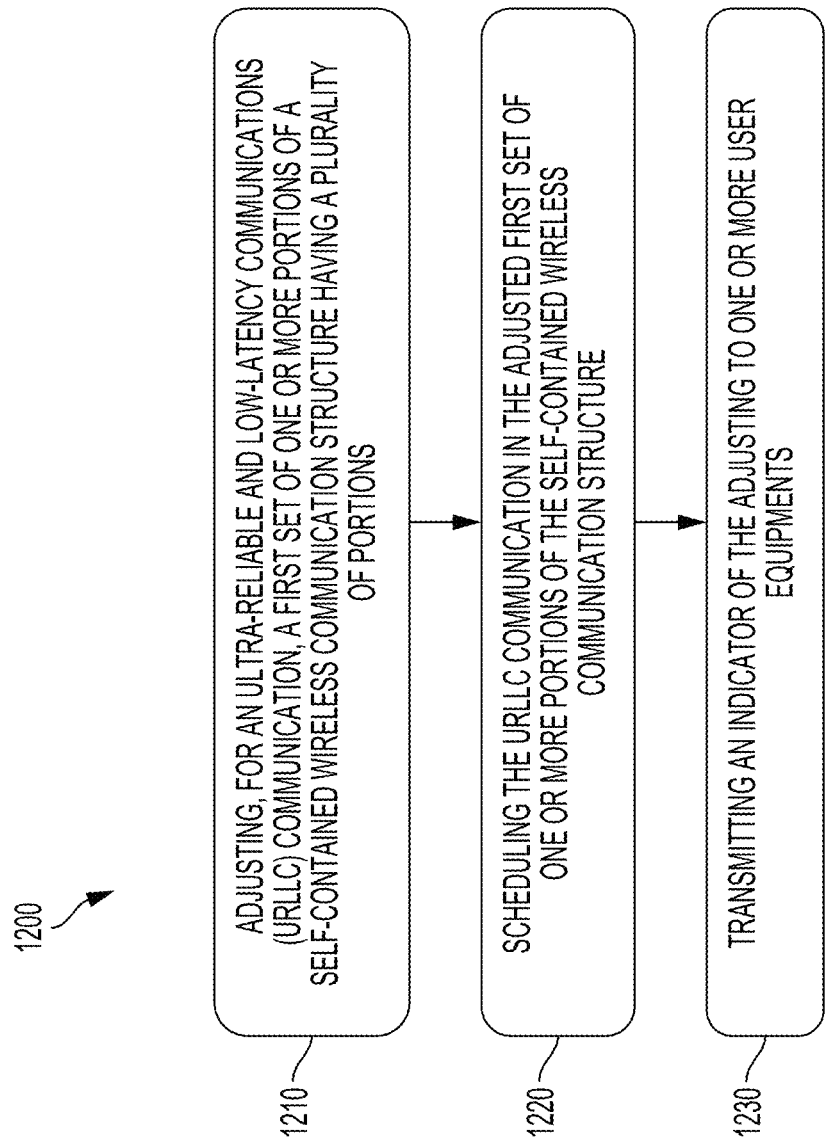
FIG. 12 is a flow chart of a second method of adjusting (e.g., dynamically) wireless communication structure in accordance with aspects of the present disclosure.

FIG. 12 is a flow chart of a second method of adjusting (e.g., dynamically) wireless communication structure in accordance with aspects of the present disclosure. The method may be performed by a base station (e.g., the BS 110 of FIG. 1, the apparatus 1600, and/or the like).

At 1210, the BS 110 may adjust, for a low-latency communication (e.g., an ultra-reliable and low-latency communications (URLLC) communication), a first set of one or more portions of a self-contained wireless communication structure having a plurality of portions. For example, the BS 110 may employ the mini-slot 1112 structure to schedule a URLLC communication 1111 with a UE 120. For example, one or more portions (e.g., symbols or portions thereof) of the UL data portion 1104 of the wireless communication structure 1100 may be adjusted from an uplink portion to a downlink portion. For example, the fourth and fifth symbols 1110 may be adjusted.

At 1220, the BS 110 may schedule the URLLC communication in the adjusted first set of one or more portions of the self-contained wireless communication structure. In this example, the BS 110 schedules the URLLC communication 1111 in the mini-slot 1112.

At 1230, the BS 110 may transmit an indicator of the adjusting to one or more UEs. For example, the BS 110 may communicate an indicator 1114 to inform one or more network entities (e.g., UEs 120) in the cell that the BS 110 is adjusting the wireless communication structure. In aspects, the indicator 1114 may include a super-fast subframe indicator (SFI). The SFI may be included in and/or associated with a URLLC communication mini-slot 1112 having a mini-slot structure. In aspects, the self-contained wireless communication structure includes at least one uplink-centric self-contained subframe. In such aspects, adjusting the first set of one or more portions of the self-contained wireless communication structure includes adjusting at least one uplink symbol of the at least one uplink-centric self-contained subframe to a downlink symbol or to a symbol having at least a downlink portion. In aspects, one or more slot structures of the self-contained wireless communication structure are defined by the plurality of portions, the first set of one or more portions is based on a mini-slot structure, wherein the mini-slot structure is smaller than a slot structure, scheduling the URLLC communication includes scheduling the URLLC communication based on the mini-slot structure, and transmitting the indicator includes transmitting the indicator in or corresponding to the mini-slot structure. In such aspects, the indicator is aligned with a boundary of the mini-slot structure. In such aspects, the mini-slot structure is aligned with a boundary of a portion. In an example, the mini-slot structure for the URLLC communication 1110 may be a 2-symbol mini-slot structure where the first symbol is used for communicating the SFI and the second symbol is used for communicating the URLLC packet. It, however, should be understood that in other examples different size mini-slot structures may be used where the SFI and low latency data (e.g., URLLC packet(s)) are allocated different numbers of symbols.

Although FIG. 12 shows example blocks of a method of wireless communication, in some aspects, the method may include additional blocks, fewer blocks, different blocks, or differently arranged blocks than those shown in FIG. 12. Additionally, or alternatively, two or more blocks shown in FIG. 12 may be performed in parallel.

Figure 13:
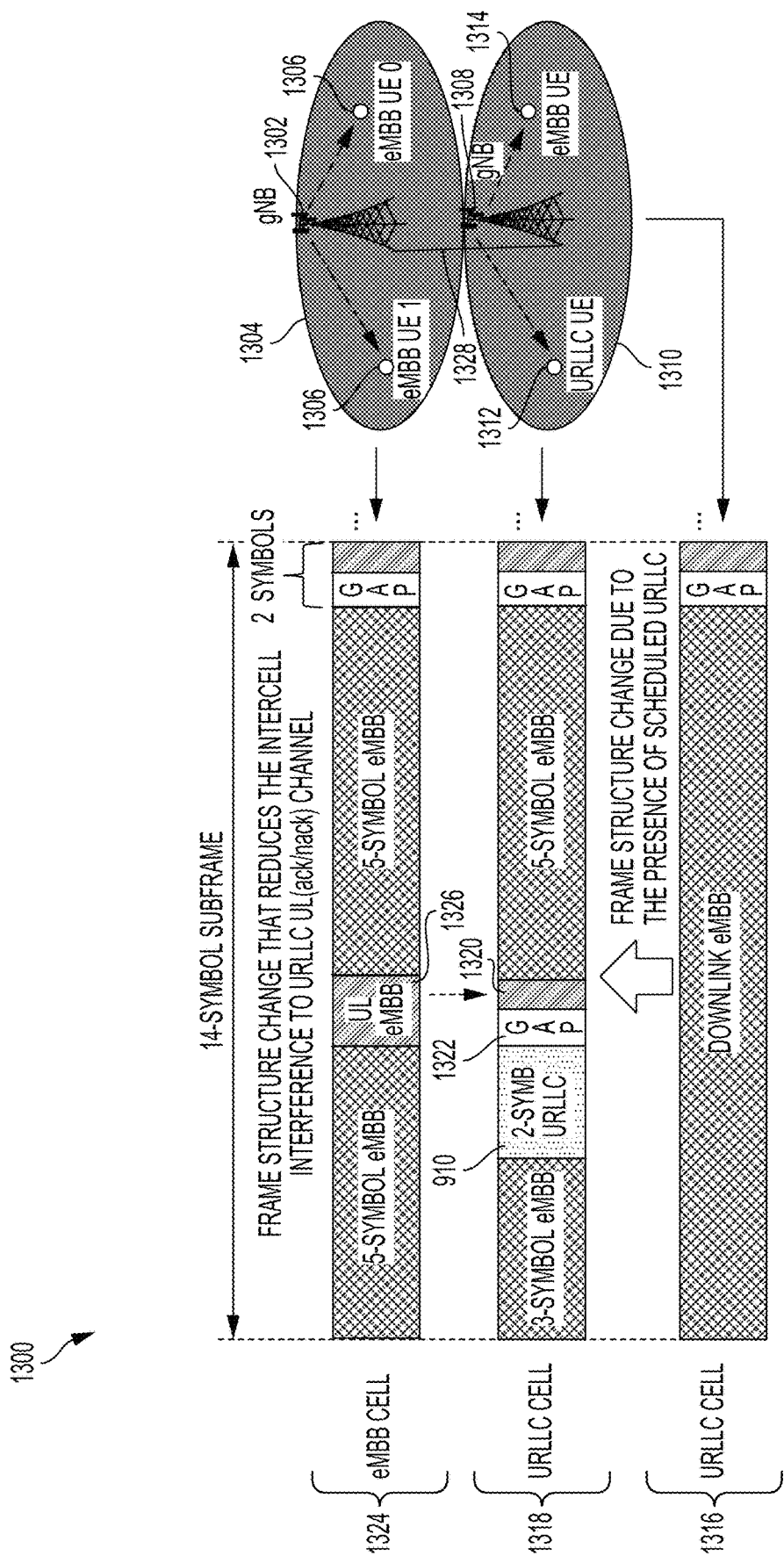
FIG. 13 is a diagram illustrating another example of adjusting wireless communication structure in accordance with aspects of the present disclosure.

FIG. 13 is a diagram illustrating another example of a subframe that may have an adjusted wireless communication structure in accordance with aspects of the present disclosure. In aspects, a neighbor base station of a base station adjusting a wireless communication structure a may also adjust a wireless communication structure the neighboring base station uses. In this manner, the neighbor base station may reduce and/or eliminate interference to the base station and/or network entities associated with the base station. With reference to FIG. 13, a first base station 1302 may be associated with a first cell 1304. The first base station 1302 may be a serving base station for one or more UEs 1306. The one or more UEs 1306 may be non-URLLC UEs or UEs performing non-URLLC communication, like eMBB communication, with the first base station 1302. Similarly, a second base station 1308 may be associated with a second cell 1310. The second base station 1308 may be a serving base station for one or more UEs. However, in contrast to the first cell 1304, at least one of the one or more UEs may be an URLLC UE or a UE performing URLLC communication 1312 with the second base station 1308. In aspects, the one or more UEs may include a UE that is an eMBB UE or a UE performing non-URLLC communication 1314, like eMBB communication, with the second base station 1308. Network entities of the second cell 1310 may adjust wireless communication structure as described herein, for example with reference to FIGS. 9-12 and 15. For example, the second base station 1308 may perform operations 900 and/or operation 1100 described above. Similarly, the one or more UEs 1312, 1314 may perform operations 1500 described below. For example, before the URLLC communication between the second base station 1308 and UE 1312, network entities of the second cell 1310 may employ wireless communication structure 1316 for communication, which as illustrated comprises a downlink data portion comprising multiple symbols followed by a one symbol gap period and then a one symbol uplink data portion For example, the second base station 1308 and UE 1314, and possibly UE 1312, may employ wireless communication structure 1316 for communication (e.g., non-URLLC communication like eMBB communication). However, for URLLC communication with UE 1312, the second base station 1308 may perform the method 900 and/or the method 1100 for adjusting wireless communication structure. The presence of a scheduled URLLC communication may cause the frame structure change (e.g., by the second base station 1308). For example, as shown in FIG. 13, the second base station 1308 may employ wireless communication structure 1318 by performing the method 900. Similarly, UEs in the second cell 1308 like UE 1312, 1314 may employ wireless communication structure 1318 by performing the method 1500.

Before such adjusting of wireless communication structure for communications in the second cell 1310, communication in the first cell 1304 between or among the first base station 1302 and the one or more UEs 1306 may employ wireless communication structure 1316, for example. However, the first base station 1302 may be a neighbor base station of the second base station 1308. Thus, to reduce interference (e.g., inter-cell interference), wireless communication structure may be adjusted for communication (e.g., non-URLLC communication like eMBB communication) in the first cell 1304. For example, the first base station 1302 may determine the second base station 1308 is adjusting wireless communication structure (e.g., a first portion of a wireless communication structure), for example, as described with reference to FIG. 9. Such determination may be based on a communication (e.g., between the first base station 1302 and the second base station 1308) indicating the adjustment of the wireless communications structure via an X2 interface or an Ethernet backhaul 1328. In this manner, the second base station 1308 may transmit a URLLC communication using the illustrated URLLC communications 910 that as shown occupies the $4^{th}$ and $5^{th}$ symbols of wireless communications structure 1318. Further, in this manner, a seventh symbol 1320 of the wireless communication structure 1318 may be adjusted from a downlink symbol to an uplink symbol. Although, in other examples, a larger or smaller portion and/or different portion of the wireless communication structure 1318 may be adjusted in this manner. A sixth symbol 1322 of the wireless communication structure 1318 may be adjusted from a downlink symbol to a gap portion. To reduce interference, the first base station 1302 may adjust wireless communication structure in coordination with the wireless communication structure adjusting performed by the second base station 1308. For example, the first base station 1302 may adjust one or more portions of wireless communication structure 800, 1316 to form wireless communication structure 1324. In this example, the sixth and seventh symbols 1326 are adjusted by the first base station 1302 from downlink symbols to uplink symbols. The first base station 1302 may communicate with the one or more UEs 1306 using such adjusted portions. Such frame structure change may reduce intercell interference (e.g., to the URLLC ACK/NACK channel associated with the second cell communication) because the first base station 1302 is no transmitting during this time. In aspects, the first base station 1302 may schedule particular UEs 1306 of the first cell 1304 to use such uplink symbols so as to avoid causing interference to UE 1312, 1314 of the second cell 1310.

Figure 14:
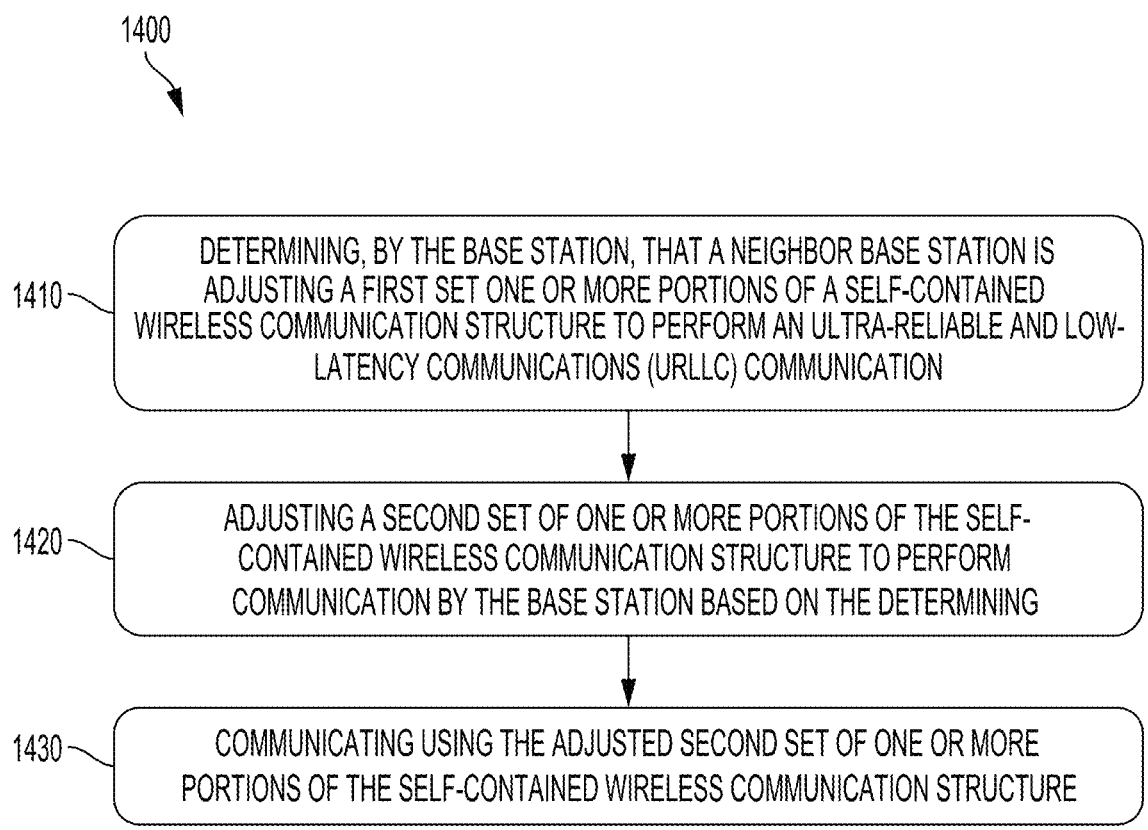
FIG. 14 is a flow chart of a third method of adjusting (e.g., dynamically) wireless communication structure in accordance with aspects of the present disclosure.

FIG. 14 is a flow chart of a third method of adjusting (e.g., dynamically) wireless communication structure in accordance with aspects of the present disclosure. The method may be performed by a base station (e.g., the BS 110 of FIG. 1, the first base station 1302, the apparatus 1700, and/or the like).

At 1410, the BS 110, 1302 may determine that a neighbor (e.g., neighboring) base station 1308 is adjusting a first set one or more portions of a self-contained wireless communication structure to perform an ultra-reliable and low-latency communications (URLLC) communication. For example, the BS 110, 1302 may determine that base station 1308 is adjusting wireless communication structure using method(s) described with reference to FIGS. 9 and or 11.

At 1420, the BS 110, 1302 may adjust a second set of one or more portions of the self-contained wireless communication structure to perform communication by the base station 110, 1302 based on the determining. In this example, the BS 110, 1302 adjusts the sixth and seventh symbols 1326 (e.g., from downlink symbols to uplink symbols) of employ wireless communication structure 1316 to form wireless communication structure 1324.

At 1430, the BS 110, 1302 may communicate using the adjusted second set of one or more portions of the self-contained wireless communication structure. Such communication may overlap or be concurrent with ACK/NACK channel communication associated with the second cell 1308. For example, the BS 110 may receive communication from the one or more UEs 1306 rather than transmit communication to the one or more UEs 1306 thereby reducing inter-cell interference (e.g., given the larger transmit power associated with a downlink transmission compared to uplink transmission). In aspects, determining, by the base station 1302, that the neighbor base station is adjusting the first set of one or more portions of the self-contained wireless communication structure to perform an URLLC communication is based on an indication of the adjustment of the wireless communications structure received via an X2 interface communication associated with the base station and the neighbor base station. In aspects, determining, by the base station, that the neighbor base station is adjusting the first set of one or more portions of the self-contained wireless communication structure to perform an URLLC communication is based on an Ethernet backhaul communication associated with the base station and the neighbor base station. In aspects, adjusting the second set of one or more portions of the self-contained wireless communication structure to perform communication by the base station includes reducing interference or potential interference to the first set of one or more portions of the self-contained wireless communication structure of a communication by the neighbor base station. In aspects, adjusting the second set of one or more portions of the self-contained wireless communication structure to perform communication by the base station further includes adjusting the second set of one or more portions from one or more downlink portions to one or more uplink portions. In aspects, the method 1400 further comprises transmitting an indicator of the adjusting the second set of one or more portions of the self-contained wireless communication structure to one or more user equipments.

Although FIG. 14 shows example blocks of a method of wireless communication, in some aspects, the method may include additional blocks, fewer blocks, different blocks, or differently arranged blocks than those shown in FIG. 14. Additionally, or alternatively, two or more blocks shown in FIG. 14 may be performed in parallel.

Figure 15:
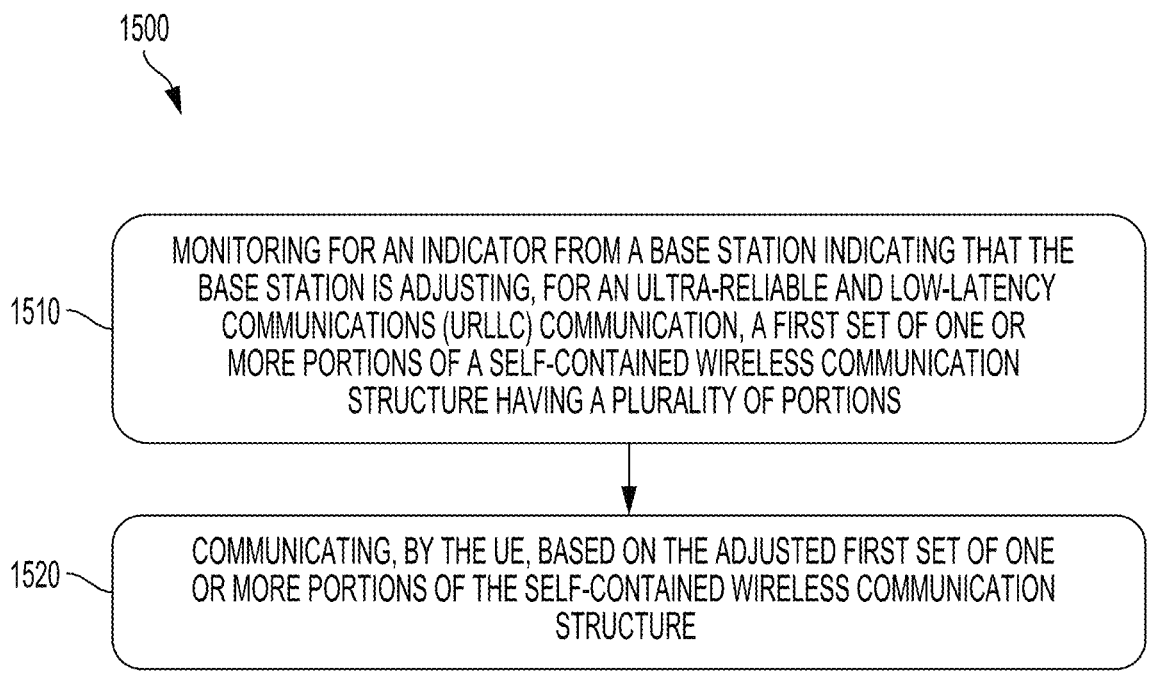
FIG. 15 is a fourth method of adjusting (e.g., dynamically) wireless communication structure in accordance with aspects of the present disclosure.

FIG. 15 is a fourth method of adjusting (e.g., dynamically) wireless communication structure in accordance with aspects of the present disclosure. The method may be performed by a user equipment (e.g., the UE 120 of FIG. 1, UEs 1306 of the first cell 1304 of FIG. 13, UEs 1312, 1314 of the second cell 1310, the apparatus 1800, and/or the like).

At 1510, a UE 120, 1304, 1306, 1312, 1314, 1800 may monitor for an indicator from a base station indicating that the base station is adjusting, for an ultra-reliable and low-latency communications (URLLC) communication, a first set of one or more portions of a self-contained wireless communication structure having a plurality of portions.

At 1520, the UE 120, 1304, 1306, 1312, 1314, 1800 may communicate based on the adjusted first set of one or more portions of the self-contained wireless communication structure.

In some aspects, the URLLC communication is associated with the base station. For example, the base station may be a base station 1308 performing the method of adjusting wireless communication structure 900 and/or the method of adjusting wireless communication structure 1100 to perform URLLC communication satisfying latency requirements and/or constraints. In such aspects, the UE 120, 1312, 1314 may employ the adjusted wireless communication structure 900 and/or the adjusted wireless communication structure 1100 to communicate with the base station. In such aspects, the communication may be a URLLC communication. Alternatively, in such aspects, the communication may be a non-URLLC communication like an eMBB communication.

In some other aspects, the URLLC is associated with a neighbor base station. For example, the base station may be a base station 1302 performing the method of adjusting wireless communication structure 1400 for non-URLLC communication by the base station 1302 to reduce interference to a neighbor base station 1308 performing URLLC communication. In such aspects, the UE 120 may be the one or more UEs 1306 of the first cell 1302 that employ the adjusted wireless communication structure 1324 to communicate with the base station 1302.

In aspects, monitoring for the indicator includes monitoring for the indicator based on a configurable periodicity. In aspects, one or more slot structures of the self-contained wireless communication structure are defined by the plurality of portions, the first set of one or more portions is based on a mini-slot structure, wherein the mini-slot structure is smaller than a slot structure, and monitoring for the indicator includes monitoring for the indicator based on the mini-slot structure. In such aspects, the indicator is aligned with a boundary of the mini-slot structure. In such aspects, the method 1500 further comprises detecting the indicator in a first mini-slot associated with the self-contained wireless communication structure, and wherein communicating, by the UE, based on the adjusted first set of one or more portions of the self-contained wireless communication structure includes suspending an uplink transmission associated with at least one other mini-slot subsequent the first mini-slot.

In aspects, adjusting transmit power (e.g., uplink transmit power) includes reducing transmit power. In aspects, the method 1500 further comprises determining, by the UE, proximity to another UE, and adjusting transmit power (e.g., uplink transmit power) based on the determining. In such aspects, the other UE is associated with URLLC communication, and the UE is associated with a different type of communication (e.g., a non-URLLC communication like an eMBB communication). In aspects, the UE is associated with at least one of an URLLC communication or a different type of communication (e.g., a non-URLLC communication like an eMBB communication).

Although FIG. 15 shows example blocks of a method of wireless communication, in some aspects, the method may include additional blocks, fewer blocks, different blocks, or differently arranged blocks than those shown in FIG. 15. Additionally, or alternatively, two or more blocks shown in FIG. 15 may be performed in parallel.

Figure 16:
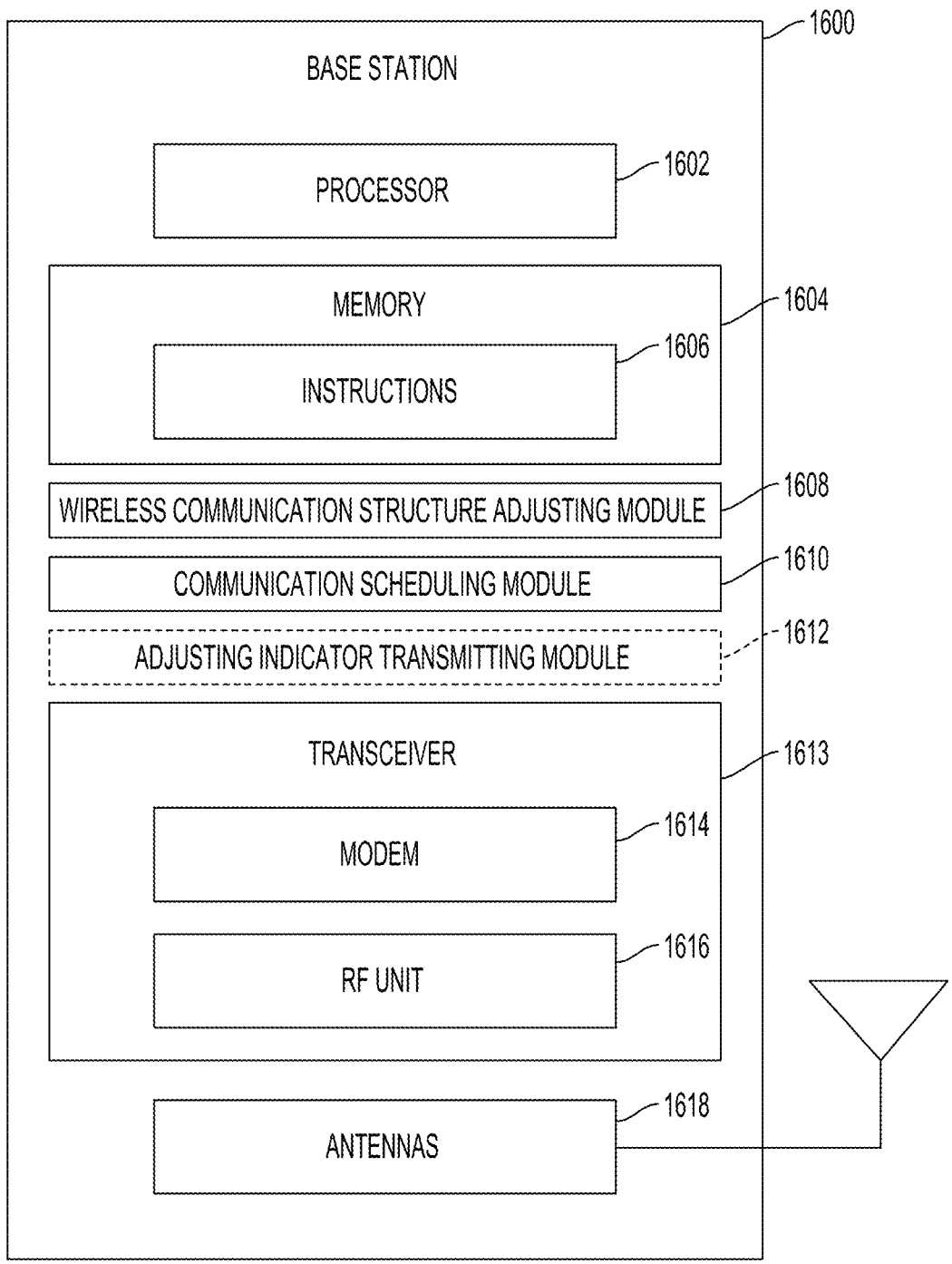
FIG. 16 is a block diagram of an exemplary base station (BS) in accordance with aspects of the present disclosure.

FIG. 16 is a block diagram of an exemplary base station (BS) 1600 in accordance with aspects of the present disclosure. In some aspects, the BS 1600 may be a BS 110, 1308 performing the method of adjusting wireless communication structure 1000 and/or method of adjusting wireless communication structure 1200 as discussed above. As shown, the BS 1600 may include a processor 1602, a memory 1604, a wireless communication structure adjusting module 1608, a communication scheduling module 1610, optionally an adjusting indicator transmitting module 1612, a transceiver 1613 including a modem subsystem 1614 and a RF unit 1616, and one or more antennas 1618. These elements may be in direct or indirect communication with each other, for example via one or more buses.

The processor 1602 may have various features as a specific-type processor. For example, these may include a CPU, a DSP, an ASIC, a controller, a FPGA device, another hardware device, a firmware device, or any combination thereof configured to perform the operations described herein. The processor 1602 may also be implemented as a combination of computing devices, e.g., a combination of a DSP and a microprocessor, a plurality of microprocessors, one or more microprocessors in conjunction with a DSP core, or any other such configuration.

The memory 1604 may include a cache memory (e.g., a cache memory of the processor 1602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 1604 may include a non-transitory computer-readable medium. The memory 1604 may store instructions 1606. The instructions 1606 may include instructions that, when executed by the processor 1602, cause the processor 1602 to perform operations described herein. Instructions 1606 may also be referred to as code, which may be interpreted broadly to include any type of computer-readable statement(s) as discussed above with respect to FIG. 16.

The wireless communication structure adjusting module 1608, the communication scheduling module 1610 and/or the adjusting indicator transmitting module 1612 may be used for various aspects of the present disclosure. For example, if the BS 1600 performs the adjusting wireless communication structure method 1000, the communication scheduling module 1610 may schedule ultra-reliable and low-latency communications (URLLC) communication in a first set of one or more portions of a self-contained wireless communication structure having a plurality of portions, and the wireless communication structure adjusting module 1608 may adjust one or more remaining portions of the self-contained wireless communication structure subsequent the first set of one or more portions based on the scheduling, as described in detail herein. In such aspects, the adjusting indicator transmitting module 1612 may transmit an indicator associated with the adjusting in or corresponding to the mini-slot structure, as described in detail herein. In aspects, the wireless communication structure adjusting module 1608 may indicate a time period, based on which one or more portions of one or more remaining subframes of the self-contained wireless communication structure are adjusted, to one or more user equipments using dynamic signaling or semi-static signaling. In aspects, the wireless communication structure adjusting module 1608 may indicate to one or more user equipments whether adjusting includes adjusting one or more portions of the self-contained wireless communication structure remaining in at least one of a current subframe in which the indicator is transmitted, adjusting one or more portions of one or more remaining subframes of the self-contained wireless communication structure based on a time period, or adjusting one or more portions of all remaining subframes of the self-contained wireless communication structure.

Alternatively, for example, if the BS 1600 performs the adjusting wireless communication structure method 1200, the wireless communication structure adjusting module 1608 may adjust, for an ultra-reliable and low-latency communications (URLLC) communication, a first set of one or more portions of a self-contained wireless communication structure having a plurality of portions, the communication scheduling module 1610 may schedule the URLLC communication in the adjusted first set of one or more portions of the self-contained wireless communication structure, and/or the adjusting indicator transmitting module 1612 may transmit an indicator of the adjusting to one or more user equipments, as described in detail herein.

As shown, the transceiver 1613 may include the modem subsystem 1614 and the RF unit 1616. The transceiver 1613 can be configured to communicate bi-directionally with other devices, such as the UEs 120 and/or another core network element. The modem subsystem 1614 may be configured to modulate and/or encode data according to a MCS, e.g., a LDPC coding scheme, a turbo coding scheme, a convolutional coding scheme, a digital beamforming scheme, etc. The RF unit 1616 may be configured to process (e.g., perform analog to digital conversion or digital to analog conversion, etc.) modulated/encoded data from the modem subsystem 1614 (on outbound transmissions) or of transmissions originating from another source such as a UE 120. The RF unit 1616 may be further configured to perform analog beamforming in conjunction with the digital beamforming. Although shown as integrated together in transceiver 1613, the modem subsystem 1614 and the RF unit 1616 may be separate devices that are coupled together at the BS 110, 1600 to enable the BS 110, 1600 to communicate with other devices.

The RF unit 1616 may provide the modulated and/or processed data, e.g. data packets (or, more generally, data messages that may contain one or more data packets and other information), to the antennas 1618 for transmission to one or more other devices. This may include, for example, transmission of information to adjust wireless communication structure according to embodiments of the present disclosure. The antennas 1618 may further receive data messages transmitted from other devices and provide the received data messages for processing and/or demodulation at the transceiver 1613. The antennas 1618 may include multiple antennas of similar or different designs in order to sustain multiple transmission links. In aspects, one or more of any of the components of the BS 1600 may adjusting wireless communication structure as described herein.

FIG. 16 is provided as an example. Other examples are possible and may differ from what was described in connection with FIG. 16.

Figure 17:
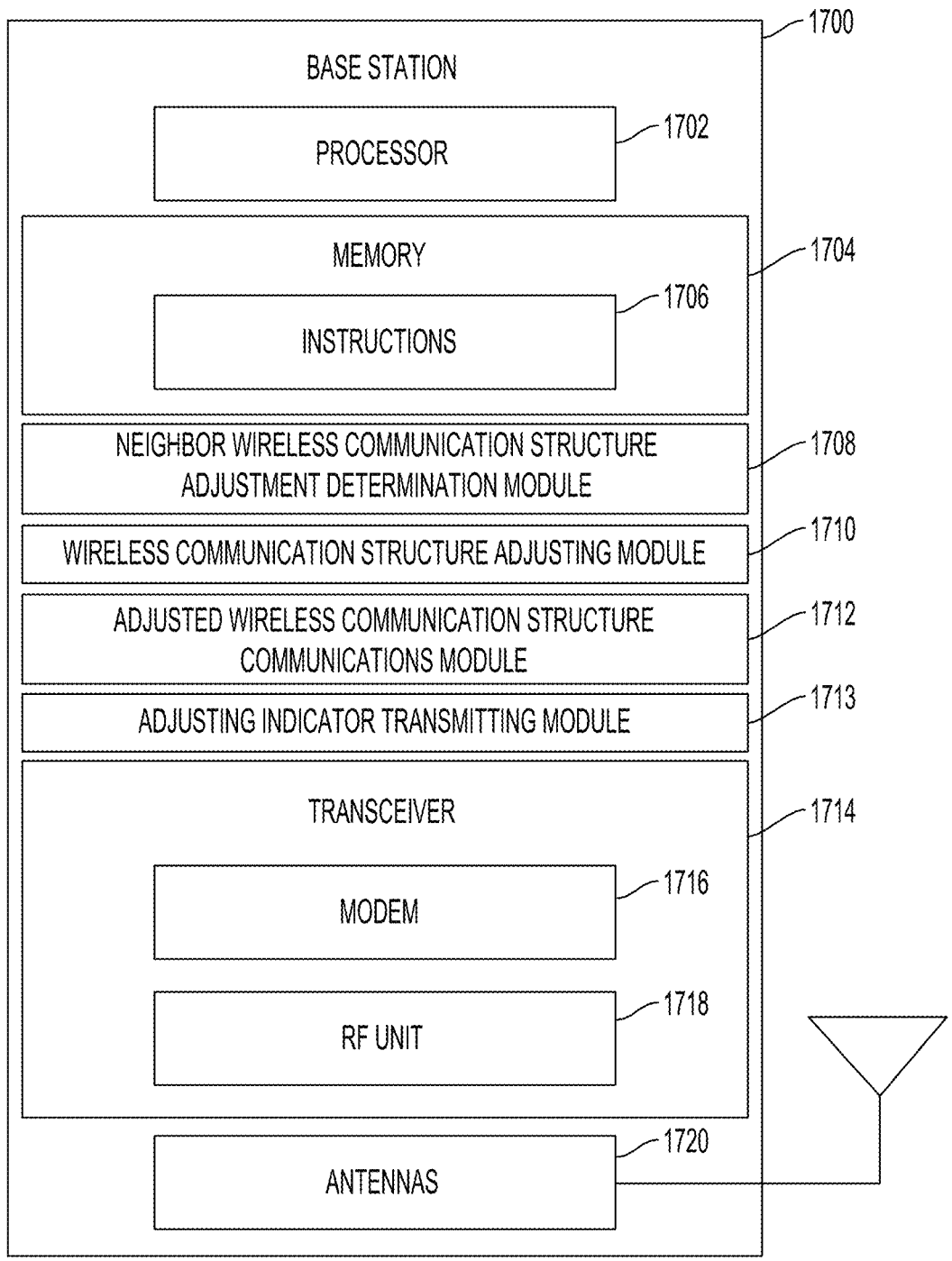
FIG. 17 is a block diagram of another exemplary base station (BS) in accordance with aspects of the present disclosure.

FIG. 17 is a block diagram of another exemplary base station (BS) 1700 in accordance with aspects of the present disclosure. In some aspects, the BS 1700 may be a BS 110, 1302 performing the method of adjusting wireless communication structure 1400 as discussed above. As shown, the BS 1700 may include a processor 1702, a memory 1704, a neighbor wireless communication structure adjustment determination module 1708, a wireless communication structure adjusting module 1710, an adjusted wireless communication structure communication module 1712, a transceiver 1714 including a modem subsystem 1716 and a RF unit 1718, and one or more antennas 1720. These elements may be in direct or indirect communication with each other, for example via one or more buses.

The processor 1702 may have various features as a specific-type processor. For example, these may include a CPU, a DSP, an ASIC, a controller, a FPGA device, another hardware device, a firmware device, or any combination thereof configured to perform the operations described herein. The processor 1702 may also be implemented as a combination of computing devices, e.g., a combination of a DSP and a microprocessor, a plurality of microprocessors, one or more microprocessors in conjunction with a DSP core, or any other such configuration.

The memory 1704 may include a cache memory (e.g., a cache memory of the processor 1702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 1704 may include a non-transitory computer-readable medium. The memory 1704 may store instructions 1706. The instructions 1706 may include instructions that, when executed by the processor 1702, cause the processor 1702 to perform operations described herein. Instructions 1706 may also be referred to as code, which may be interpreted broadly to include any type of computer-readable statement(s) as discussed above with respect to FIG. 17.

The neighbor wireless communication structure adjustment determination module 1708, the wireless communication structure adjusting module 1710, and/or the adjusted wireless communication structure communications module 1712 may be used for various aspects of the present disclosure. For example, neighbor wireless communication structure adjustment determination module 1708 may be used to determine if a neighbor base station is adjusting a first set one or more portions of a self-contained wireless communication structure. The wireless communication structure adjusting module 1710 may be configured to adjust one or more portions of the self-contained wireless communication structure to perform communication by the base station based on the determining by module 1708. For example, as discussed above with reference to FIG. 13, module 1710 may adjust the wireless communication structure used by base station 1700 from wireless communication structure 1316 to wireless communication structure 1324 based on a determination by module 1708 that a different base station (e.g., base station 1308) is using wireless communication structure 1318. The adjusted wireless communication structure communications module 1712 may configure the base station 1700 to communicate using the adjusted wireless communication structure (e.g., structure 1324), as described in detail herein. In aspects, the base station may include an adjusting indicator transmitting module 1713. Such module may transmit an indicator that base station 1700 is using an adjusted wireless communication structure (e.g., structure 1324), as described in detail herein.

As shown, the transceiver 1714 may include a modem subsystem 1716 and a RF unit 1718. The transceiver 1714 can be configured to communicate bi-directionally with other devices, such as the UEs 120 and/or another core network element. The modem subsystem 1716 may be configured to modulate and/or encode data according to a MCS, e.g., a LDPC coding scheme, a turbo coding scheme, a convolutional coding scheme, a digital beamforming scheme, etc. The RF unit 1718 may be configured to process (e.g., perform analog to digital conversion or digital to analog conversion, etc.) modulated/encoded data from the modem subsystem 1716 (on outbound transmissions) or of transmissions originating from another source such as a UE 120. The RF unit 1718 may be further configured to perform analog beamforming in conjunction with the digital beamforming. Although shown as integrated together in transceiver 1714, the modem subsystem 1716 and the RF unit 1718 may be separate devices that are coupled together at the BS 110, 1700 to enable the BS 110, 1700 to communicate with other devices. The RF unit 1718 may provide the modulated and/or processed data, e.g. data packets (or, more generally, data messages that may contain one or more data packets and other information), to the antennas 1720 for transmission to one or more other devices. This may include, for example, transmission of information to adjust wireless communication structure according to embodiments of the present disclosure. The antennas 1720 may further receive data messages transmitted from other devices and provide the received data messages for processing and/or demodulation at the transceiver 1714. The antennas 1720 may include multiple antennas of similar or different designs in order to sustain multiple transmission links. In aspects, one or more of any of the components of the BS 1700 may adjust wireless communication structure as described herein.

FIG. 17 is provided as an example. Other examples are possible and may differ from what was described in connection with FIG. 17.

Figure 18:
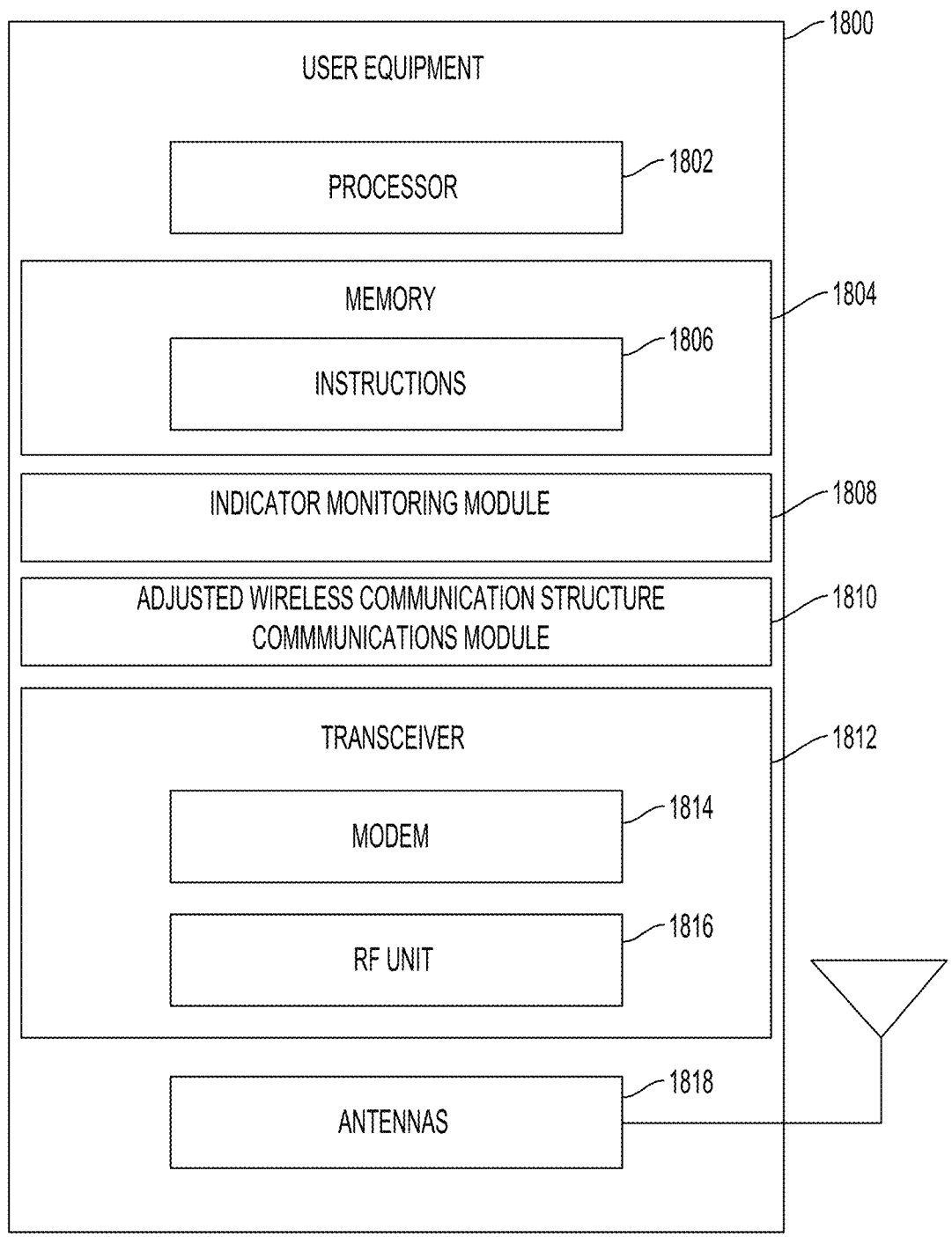
FIG. 18 is a block diagram of an exemplary user equipment (UE) in accordance with aspects of the present disclosure.

FIG. 18 is a block diagram of an exemplary user equipment (UE) 1800 in accordance with aspects of the present disclosure. The UE 1800 may be a UE 120, a UE 1306 of the first cell 1304 of FIG. 13, a UE 1312, 1314 of the second cell 1310 of FIG. 13 as discussed above. As shown, the UE 1800 may include a processor 1802, a memory 1804, a indicator monitoring module 1808, a an adjusted wireless communication structure communications module 1810, a transceiver 1812 including a modem subsystem 1814 and a radio frequency (RF) unit 1816, and one or more antennas 1818. These elements may be in direct or indirect communication with each other, for example via one or more buses.

The processor 1802 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 1802 may also be implemented as a combination of computing devices, e.g., a combination of a DSP and a microprocessor, a plurality of microprocessors, one or more microprocessors in conjunction with a DSP core, or any other such configuration.

The memory 1804 may include a cache memory (e.g., a cache memory of the processor 1802), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 1804 includes a non-transitory computer-readable medium. The memory 1804 may store instructions 1806. The instructions 1806 may include instructions that, when executed by the processor 1802, cause the processor 1802 to perform the operations described herein with reference to one or more of the UEs 120, 1306, 1312, 1314 in connection with embodiments of the present disclosure. Instructions 1806 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The indicator monitoring module 1808, and/or the adjusted wireless communication structure communications module 1810 may be used for various aspects of the present disclosure. For example, the UE 1800 may be UE 1312, 1314 of the second cell 1308. In such aspects, the indicator monitoring module 1808 may monitor for an indicator from a base station indicating that the base station adjusted (e.g., for an ultra-reliable and low-latency communications (URLLC) communication) a first set of one or more portions of a self-contained wireless communication structure having a plurality of portions, such as discussed above. The adjusted wireless communication structure communications module 1810 may communicate based on the adjusted first set of one or more portions of the self-contained wireless communication structure.

In some aspects, a serving base station for the UE 1800 may perform the URLLC communication. For example, the base station may be a base station 1308 performing the method of adjusting wireless communication structure 1000 and/or the method of adjusting wireless communication structure 1200 to perform URLLC communication satisfying latency requirements and/or constraints. The UE 1800, 1312, 1314 may employ the adjusted wireless communication structure 900 and/or the adjusted wireless communication structure 1100 to communicate with the base station. Thus, the communicating based on the adjusted wireless communication structure module 1810 may communicate with the base station 1308 using the adjusted wireless communication structure 900, 1318 and/or the adjusted wireless communication structure 1100. In such aspects, the communication may be a URLLC communication. Alternatively, in such aspects, the communication may be a non-URLLC communication like an eMBB communication.

In some aspects, a neighbor base station for a serving base station of the UE 1800 may perform the URLLC communication. For example, the base station 1800 may be a base station 1302 performing the method of adjusting wireless communication structure 1400 for non-URLLC communication by the base station 1800 to reduce interference to a neighbor base station 1308 performing URLLC communication. Thus, the communicating based on the adjusted wireless communication structure module 1810 may communicate with the base station 1302 using the adjusted wireless communication structure 1324. In such aspects, the UE 1800 may be a UE 1306 of the first cell 1302. In such aspects, the communication may be a non-URLLC communication like an eMBB communication.

As shown, the transceiver 1812 may include the modem subsystem 1814 and the RF unit 1816. The transceiver 1812 can be configured to communicate bi-directionally with other devices, such as the BSs 110. The modem subsystem 1814 may be configured to modulate and/or encode the data from the memory 1804, the base station is adjusting wireless communication structure indicator monitoring module 1808, and/or the communicating based on the adjusted wireless communication structure module 1810 according to a modulation and coding scheme (MCS), e.g., a low-density parity check (LDPC) coding scheme, a turbo coding scheme, a convolutional coding scheme, a digital beamforming scheme, etc. The RF unit 1816 may be configured to process (e.g., perform analog to digital conversion or digital to analog conversion, etc.) modulated/encoded data from the modem subsystem 1814 (on outbound transmissions) or of transmissions originating from another source such as another UE 120 or a BS 110. The RF unit 1816 may be further configured to perform analog beamforming in conjunction with the digital beamforming. Although shown as integrated together in transceiver 1812, the modem subsystem 1814 and the RF unit 1816 may be separate devices that are coupled together at the UE 120, 1306, 1312, 1314 to enable the UE 120, 1306, 1312, 1314 to communicate with other devices.

The RF unit 1816 may provide the modulated and/or processed data, e.g. data packets (or, more generally, data messages that may contain one or more data packets and other information), to the antennas 1818 for transmission to one or more other devices. This may include, for example, transmission of non-URLLC communication and/or URLLC communication, according to embodiments of the present disclosure. The antennas 1818 may further receive data messages transmitted from other devices. The antennas 1818 may provide the received data messages for processing and/or demodulation at the transceiver 1812. The antennas 1818 may include multiple antennas of similar or different designs in order to sustain multiple transmission links. The RF unit 1816 may configure the antennas 1818. In aspects, one or more of any of the components of the UE 120, 1306, 1312, 1314 may perform adjusting wireless communication structure as described herein.

FIG. 18 is provided as an example. Other examples are possible and may differ from what was described in connection with FIG. 18.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication by a network node, comprising:

transmitting, to a user equipment (UE), radio resource control signaling indicating a timer associated with an adjustment of symbols within a self-contained wireless communication structure;

scheduling a low-latency packet for transmission to the UE in symbols of a first slot of the self-contained wireless communication structure, the first slot comprising a plurality of downlink and uplink symbols;

adjusting, based on the scheduling of the low-latency packet, a plurality of downlink symbols of the first slot to at least one symbol comprising a switching gap and at least one uplink symbol for transmitting ACK/NACK information associated with the low-latency packet, wherein adjusting the plurality of downlink symbols is based at least in part on the plurality of downlink symbols being included within an active duration of the timer, and wherein the plurality of downlink symbols is separate from a scheduled portion of the first slot for transmitting the low-latency packet;

transmitting the low-latency packet to the UE, wherein at least one symbol of the low-latency packet comprises an indicator of the adjusting, wherein the indicator of the adjusting applies to a quantity of slots, including the first slot, within the active duration of the timer; and receiving, from the UE, an acknowledgement message comprising the ACK/NACK information associated with the low-latency packet on the at least one uplink symbol of the first slot that is subsequent to the switching gap.

2. The method of claim 1, wherein the low-latency packet comprises an ultra-reliable and low-latency communications (URLLC) packet.

3. The method of claim 1, wherein:
scheduling the low-latency packet comprises scheduling the low-latency packet based on a mini-slot structure; and
transmitting the low-latency packet comprises transmitting the indicator based on the mini-slot structure.

4. The method of claim 3, wherein the indicator is aligned with a boundary of the mini-slot structure.

5. The method of claim 1, wherein:
the first slot of the self-contained wireless communication structure is a downlink-centric slot, and
the at least one uplink symbol adjusted from the plurality of downlink symbols is subsequent to the scheduled portion for transmitting the low-latency packet.

6. The method of claim 1, wherein:
a second slot of the self-contained wireless communication structure is an uplink-centric slot, wherein the second slot is included in the quantity of slots;
the adjusting further comprises adjusting at least one uplink symbol to at least one downlink symbol in the second slot of the self-contained wireless communication structure; and
the at least one downlink symbol adjusted from the at least one uplink symbol is within a scheduled portion of the second slot for transmitting another low-latency packet.

7. The method of claim 6, wherein the another low-latency packet is transmitted on the at least one downlink symbol of the second slot adjusted from the at least one uplink symbol.

8. The method of claim 1, further comprising:
transmitting an indication of an adjustment of the self-contained wireless communication structure to a neighboring network node using an X2 interface communication or an Ethernet backhaul communication.

9. A method of wireless communication by a user equipment (UE), comprising:
receiving radio resource control signaling indicating a timer associated with an adjustment of symbols within a self-contained wireless communication structure;
determining that the UE is scheduled for reception of a low-latency packet in symbols of a first slot of the self-contained wireless communication structure, the first slot comprising a plurality of downlink and uplink symbols;
receiving the low-latency packet in a scheduled portion of the first slot, wherein at least one symbol of the low-latency packet comprises an indicator of an adjustment for a plurality of downlink symbols of the first slot based at least in part on the scheduling of the low-latency packet, wherein the adjustment comprises changing a plurality of downlink symbols of the first slot to at least one symbol comprising a switching gap and at least one uplink symbol for transmitting ACK/NACK information associated with the low-latency packet, wherein the plurality of downlink symbols is adjusted based at least in part on the plurality of downlink symbols being included within an active duration of the timer, wherein the plurality of downlink symbols is separate from the scheduled portion of the first slot for receiving the low-latency packet; and transmitting an acknowledgement message comprising the ACK/NACK information associated with the low-latency packet on the at least one uplink symbol of the first slot that is subsequent to the switching gap, wherein the UE is configured to apply the adjustment for a quantity of slots, including the first slot, within the active duration of the timer.

10. The method of claim 9, wherein the low-latency packet comprises an ultra-reliable and low-latency communications (URLLC) packet.

11. The method of claim 9, wherein:
the UE is scheduled for reception of the low-latency packet based on a mini-slot structure, and
receiving the low-latency packet comprises receiving the indicator in or corresponding to the mini-slot structure.

12. The method of claim 11, wherein the indicator is aligned with a boundary of the mini-slot structure.

13. The method of claim 9, wherein:
the first slot of the self-contained wireless communication structure comprises a downlink-centric slot of the self-contained wireless communication structure, and
the at least one uplink symbol adjusted from the plurality of downlink symbols is subsequent to the scheduled portion for receiving the low-latency packet.

14. The method of claim 9, wherein:
a second slot of the self-contained wireless communication structure includes an uplink-centric slot, wherein the second slot is included in the quantity of slots;
at least one uplink symbol of the second slot is adjusted to at least one downlink symbol; and
the at least one downlink symbol adjusted from the at least one uplink symbol is within a scheduled portion of the second slot for receiving another low-latency packet.

15. The method of claim 14, wherein the another low-latency packet is received on the at least one downlink symbol of the second slot adjusted from the at least one uplink symbol.

16. An apparatus for wireless communication, comprising:
a processor; and
memory coupled with the processor, wherein the processor is configured to:
transmit, to a user equipment (UE), radio resource control signaling indicating a timer associated with an adjustment of symbols within a self-contained wireless communication structure;
schedule a low-latency packet for transmission to the UE in symbols of a first slot of the self-contained wireless communication structure, the first slot comprising a plurality of downlink and uplink symbols;
adjust, based on the scheduling of the low-latency packet, a plurality of downlink symbols of the first slot to at least one symbol comprising a switching gap and at least one uplink symbol for transmitting ACK/NACK information associated with the low-latency packet, wherein adjusting the plurality of downlink symbols is based at least in part on the plurality of downlink symbols being included within an active duration of the timer, and wherein the plurality of downlink symbols is separate from a scheduled portion of the first slot for transmitting the low-latency packet;

transmit the low-latency packet to the UE, wherein at least one symbol of the low-latency packet comprises an indicator of the adjusting, wherein the indicator of the adjusting applies to a quantity of slots, including the first slot, within the active duration of the timer; and receive, from the UE, an acknowledgement message comprising the ACK/NACK information associated with the low-latency packet on the at least one uplink symbol of the first slot that is subsequent to the switching gap.

17. The apparatus of claim 16, wherein the low-latency packet comprises an ultra-reliable and low-latency communications (URLLC) packet.

18. The apparatus of claim 16, wherein:
the first slot of the self-contained wireless communication structure comprises a downlink-centric slot of the self-contained wireless communication structure, and
the at least one uplink symbol adjusted from the plurality of downlink symbols is subsequent to the scheduled portion for transmitting the low-latency packet.

19. The apparatus of claim 16, wherein:
a second slot of the self-contained wireless communication structure comprises an uplink-centric slot, wherein the second slot is included in the quantity of slots; and
the processor is configured to adjust at least one uplink symbol to at least one downlink symbol in the second slot, wherein the at least one downlink symbol adjusted from the at least one uplink symbol is within a scheduled portion of the second slot for transmitting another low-latency packet.

20. The apparatus of claim 19, wherein the processor is configured to transmit the another low-latency packet on the at least one downlink symbol adjusted from the at least one uplink symbol.

21. The apparatus of claim 16, wherein the processor is further configured to:
transmit an indication of an adjustment of the self-contained wireless communication structure to a neighboring network node using an X2 interface communication or an Ethernet backhaul communication.

22. An apparatus for wireless communication at a user equipment (UE), comprising:
a processor; and
a memory coupled with the processor, wherein the processor is configured to:
receive radio resource control signaling indicating a timer associated with an adjustment of symbols within a self-contained wireless communication structure;

determine that the UE is scheduled for reception of a low-latency packet in symbols of a first slot of the self-contained wireless communication structure, the first slot comprising a plurality of downlink and uplink symbols;

receive the low-latency packet in a scheduled portion of the first slot, wherein at least one symbol of the low-latency packet comprises an indicator of an adjustment for a plurality of downlink symbols of the first slot based at least in part on the scheduling of the low-latency packet, wherein the adjustment comprises changing a plurality of downlink symbols of the first slot to at least one symbol comprising a switching gap and at least one uplink symbol for transmitting ACK/NACK information associated with the low-latency packet, wherein the plurality of downlink symbols is adjusted based at least in part on the plurality of downlink symbols being included within an active duration of the timer, wherein the plurality of downlink symbols is separate from the scheduled portion of the first slot; and transmit an acknowledgement message comprising the ACK/NACK information associated with the low-latency packet on the at least one uplink symbol of the first slot that is subsequent to the switching gap, wherein the UE is configured to apply the adjustment for a quantity of slots, including the first slot, within the active duration of the timer.

23. The apparatus of claim 22, wherein the low-latency packet comprises an ultra-reliable and low-latency communications (URLLC) packet.

24. The apparatus of claim 23, wherein:
the first slot of the self-contained wireless communication structure comprises a downlink-centric slot, and
the at least one uplink symbol adjusted from the plurality of downlink symbols is subsequent to the scheduled portion for receiving the low-latency packet.

25. The apparatus of claim 22, wherein:
a second slot of the self-contained wireless communication structure includes an uplink-centric slot, wherein the second slot is included in the quantity of slots;
the indicator indicates that at least one uplink symbol in the second slot is adjusted to at least one downlink symbol; and
the at least one downlink symbol adjusted from the at least one uplink symbol of the second slot is within a scheduled portion of the second slot for receiving another low-latency packet.

26. The apparatus of claim 25, wherein the processor is configured to receive the another low-latency packet on the at least one downlink symbol of the second slot adjusted from the at least one uplink symbol.

* * * * *